US012445761B2

(12) United States Patent
Moser et al.

(10) Patent No.: US 12,445,761 B2
(45) Date of Patent: Oct. 14, 2025

(54) PRECISELY CONTROLLED MICROPHONE ACOUSTIC ATTENUATOR WITH PROTECTIVE MICROPHONE ENCLOSURE

(71) Applicant: Quiet, Inc., La Jolla, CA (US)

(72) Inventors: Scott A. Moser, La Jolla, CA (US); Carlos Montoya, San Diego, CA (US); Peter L. Madaffari, Camden, ME (US); Vijay Parsa, London (CA); Niamh C. Finnegan, Bristol (GB)

(73) Assignee: Quiet, Inc., La Jolla, CA (US)

( * ) Notice: Subject to any disclaimer, the term of this patent is extended or adjusted under 35 U.S.C. 154(b) by 0 days.

(21) Appl. No.: 18/215,546

(22) Filed: Jun. 28, 2023

(65) Prior Publication Data

US 2023/0345158 A1 Oct. 26, 2023

Related U.S. Application Data

(63) Continuation-in-part of application No. 17/700,069, filed on Mar. 21, 2022, now Pat. No. 11,785,375.

(Continued)

(51) Int. Cl.

| | |
|---|---|
| ***H04R 1/08*** | (2006.01) |
| ***G10L 13/027*** | (2013.01) |
| ***H04R 7/02*** | (2006.01) |

(52) U.S. Cl.

CPC ............ *H04R 1/083* (2013.01); *G10L 13/027* (2013.01); *H04R 7/02* (2013.01); *H04R 2207/021* (2013.01); *H04R 2231/003* (2013.01)

(58) Field of Classification Search

CPC .... H04R 1/083; H04R 7/02; H04R 2207/021; H04R 2231/003; G10L 13/027

See application file for complete search history.

(56) References Cited

U.S. PATENT DOCUMENTS

| | | | |
|---|---|---|---|
| 1,700,553 | A | 1/1929 | Swan |
| 1,909,375 | A | 5/1933 | Muller |

(Continued)

FOREIGN PATENT DOCUMENTS

| | | | |
|---|---|---|---|
| EP | 0453061 | A2 | 10/1991 |
| GB | 2228646 | A | 8/1990 |

OTHER PUBLICATIONS

Notice of references cited, U.S. Appl. No. 17/700,069 by Edgardo San Martin.

*Primary Examiner* — Mark Fischer

(74) *Attorney, Agent, or Firm* — THE BUCHE LAW FIRM, PC; John K. Buche; Bryce A. Johnson

(57) ABSTRACT

An attenuator is disclosed that enables a microphone's relatively undistorted pick up of a voice that is generated in close proximity to the microphone. This attenuator is a key component of a groundbreaking assistive device or handset/headset that empowers individuals with speech impairments to effectively communicate and reintegrate into society. By leveraging advanced acoustic hardware, intelligent voice algorithms, and a comprehensive image-or-vocabulary-to-impaired-voice database, the handset/headset facilitates understanding the user's impaired speech by harvesting understood terminology and outputting the same in a communicative context. Thus, the handset/headset enables seamless public interaction, independence, and improved quality of life to the user with speech impediments and ensures equal participation and inclusion in everyday verbal interactions.

2 Claims, 22 Drawing Sheets

Related U.S. Application Data

(60) Provisional application No. 63/210,631, filed on Jun. 15, 2021.

(56) References Cited

U.S. PATENT DOCUMENTS

| | | | | |
|---|---|---|---|---|
| 2,408,474 | A | 10/1946 | Newman et al. | |
| 2,485,278 | A | 10/1949 | Gilman et al. | |
| 2,508,581 | A | 5/1950 | Morrow | |
| 2,572,547 | A | 10/1951 | Webb | |
| 2,745,911 | A | 5/1956 | Webb | |
| 2,769,040 | A | 10/1956 | Di Mattia | |
| 2,855,067 | A | 10/1958 | Di Mattia | |
| 2,857,013 | A | 10/1958 | Orso | |
| 3,946,422 | A | 3/1976 | Yagi et al. | |
| 4,189,627 | A | 2/1980 | Flanagan | |
| 4,263,484 | A | 4/1981 | Hisatsune et al. | |
| 4,281,222 | A | 7/1981 | Nakagawa | |
| 4,584,702 | A | 4/1986 | Walker, Jr. | |
| 4,773,091 | A | 9/1988 | Busche et al. | |
| 4,807,612 | A | 2/1989 | Carlson | |
| 4,852,683 | A | 8/1989 | Killion | |
| 5,146,502 | A * | 9/1992 | Davis | G09B 21/009 704/271 |
| 5,473,684 | A | 12/1995 | Bartlett et al. | |
| 5,539,834 | A | 7/1996 | Bartlet et al. | |
| 6,122,389 | A | 9/2000 | Grosz | |
| 6,690,800 | B2 | 2/2004 | Resnick | |
| 6,757,399 | B1 | 6/2004 | Cheng | |
| 7,050,597 | B2 | 5/2006 | Akino | |
| 7,072,482 | B2 | 7/2006 | Van Doorn | |
| 7,136,500 | B2 | 11/2006 | Collins | |
| 7,245,726 | B2 | 7/2007 | Du et al. | |
| 7,298,859 | B1 | 11/2007 | Worley et al. | |
| 7,623,671 | B2 | 11/2009 | Akino | |
| 7,783,034 | B2 | 8/2010 | Manne | |
| 8,428,285 | B2 | 4/2013 | Khamashta et al. | |
| 9,118,989 | B2 | 8/2015 | Zukowski | |
| 9,571,919 | B2 | 2/2017 | Hsu Huang et al. | |
| 9,596,533 | B2 | 3/2017 | Akino | |
| 9,609,411 | B2 | 3/2017 | Parkins | |
| 9,628,897 | B2 | 4/2017 | Fletcher et al. | |
| 9,654,873 | B2 | 5/2017 | Akino | |
| 9,912,819 | B2 | 3/2018 | Webb et al. | |
| 9,924,261 | B2 | 3/2018 | Parkins | |
| 9,936,284 | B2 | 4/2018 | Howes et al. | |
| 11,146,884 | B2 | 10/2021 | Chang et al. | |
| 2003/0142833 | A1* | 7/2003 | Roy | G10K 11/1754 381/59 |
| 2005/0089180 | A1 | 4/2005 | Saeki et al. | |
| 2005/0135648 | A1 | 6/2005 | Lee | |
| 2010/0067732 | A1 | 3/2010 | Hachinohe et al. | |
| 2010/0299148 | A1* | 11/2010 | Krause | G10L 25/69 704/E15.04 |
| 2011/0280418 | A1 | 11/2011 | Matsunga | |
| 2012/0139066 | A1 | 6/2012 | Je et al. | |
| 2013/0156246 | A1* | 6/2013 | Menyhart | H04R 1/2807 381/355 |
| 2017/0309154 | A1* | 10/2017 | Zhong | G08B 21/182 |
| 2022/0279874 | A1* | 9/2022 | Bergman | G10L 15/26 |

* cited by examiner

PRECISELY CONTROLLED MICROPHONE ACOUSTIC ATTENUATOR WITH PROTECTIVE MICROPHONE ENCLOSURE

CROSS-REFERENCE TO RELATED APPLICATIONS

This application is a continuation-in-part of U.S. patent application Ser. No. 17/700,069 (filed Mar. 21, 2023) entitled Precisely Controlled Microphone Acoustic Attenuator with Protective Microphone Enclosure. U.S. Ser. No. 17/700,069 is a non-provisional filing of U.S. App. Ser. No. 63/210,631 (filed Jun. 15, 2021) entitled Precisely Controlled MICROPHONE Acoustic Attenuation with Protective Microphone Enclosure. Both U.S. application Ser. No. 17/700,069 and 63/210,631 are incorporated herein by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The subject matter of this specification is within the field of assistive technology, specifically focusing on speech assistive technology. Assistive technology refers to devices, software, or equipment designed to enhance the functional capabilities and independence of individuals with speech disabilities. In this case, the disclosed subject matter is designed to assist individuals with their speech impairments by providing automated real-time association of impaired speech with intelligible outputs, enabling effective communication with others. In some situations, the assistive technology disclosed herein requires a user to speak into a device that has been sealed around the user's mouth and, so, the disclosed subject matter is also in the field of acoustic attenuators for microphones to prevent sound distortion from high sound pressure levels.

Background of the Invention

Communication is a vital part of life and emotional connections with others. Communication enables a person's expression of thoughts, sharing of information, and connection to others. That is why, for individuals with speech impediments or mental/muscular defects affecting speech, communication can be non-existent or else a significant challenge. It can often be difficult for a speech impediment suffer to try and alter their natural cadence and pronunciation in an unsuccessful effort to have a listener understand. To wit, a sufferer of speech impediments or impairments often struggles to articulate words or produce intelligible speech, and this can be frustrating, isolating, and deterring of social interactions.

Speech therapy is the traditional approach for treating speech impediments or impairments and improve communication skills. However, therapy is time consuming, expensive, and requires tremendous effort to achieve minor to significant results. Most speech therapy recipients find it challenging to reach a level of fluent speech that enables effective communication in public settings, leading to feelings of embarrassment, shyness, and social withdrawal. There are certain situations where speech therapy is simply ineffective to rehabilitate mental or muscular disabilities affecting speech.

Recognizing this problem and the need for a solution, the subject matter of this disclosure is something like a telephonic handset or headset that includes assistive technology. The innovative handset/headset disclosed herein empowers individuals with speech impairments by providing them with a means to overcome communication barriers and regain their confidence in interacting with others.

The handset/headset disclosed herein enables communication by individuals with speech impediments or impairments via leveraging advanced technology and voice intelligent algorithms. Most generally, the device combines a specially designed handset/headset with sophisticated software installed in its or another device's computer memory, central processing unit (CPU) or processor, and related database. The software employs a range of signal processing techniques and language recognition algorithms to enable automated real-time association of the user's impeded or impaired speech with intelligible outputs.

In one mode of operation, the user may enclose their mouth in chamber and speak into an enclosed microphone. Suitably, and the advanced microphone and analog matching circuit convert the voice's acoustic signal into an electrical signal. The electrical signal may then be processed through a series of audio signal conditioning phases, including but not limited to amplification, equalization, noise elimination, and digital filtering, within the device's Bluetooth chip.

After audio signal processing, the audio signal may be transmitted wirelessly to a connected cell phone, laptop, or other compatible device running a cooperating version of the assistive technology's software. The software may suitably be equipped with an impaired speech assistance training/interpretation module and a comprehensive user voice recognition database, performs intricate analysis and comparison of the user's speech with values within the stored database.

Using the training module, the user can associate previously provided recordings of user or computer selected vocabulary words, images, or phrases, in their impaired rendition with correct computerized rendition of the same user or computer selected vocabulary words, images or phrases. This personalized database allows the software to accurately interpret the user's partially intelligible or non-intelligible speech via matching the raw words to the corresponding correct renditions, the software generates appropriate phrases using the associated computerized rendition or converts the partially intelligible or non-intelligible speech into written text that can be displayed on a device running the cooperating version of the software.

The output options of the partially intelligible or non-intelligible speech that has been corrected may be versatile, offering flexibility for the user's preferences and communication needs. The generated text, for example, can be displayed within the software's notepad-like section, allowing seamless integration with other applications such as emails or messaging platforms. Additionally, the software can generate a pronounced, voice that can be transmitted back to the handset/headset via Bluetooth. The intelligible audio signal represented in the computerized rendition of the correct speech may then emitted from another of the handset's/headset's speaker, enabling real-time communication with the people around the user. It should be noted that the generated voice could be robot-like or also be any style of voice or person that is computer generated. For example, the computer-generated voice may be a man's voice with an English accent or a voice reflecting the accent of the user's place of origin or a voice type that is similar to what user's voice would be but for the impediment.

Furthermore, the software allows for direct transmission of the generated intelligible voice signal that has been treated with the voice algorithm through wireless communication channels like cell phone calls or computer-based calls. This feature enables the user to have live conversations with others, where the listener hears the computer-generated voice.

The handset/headset and related software represents a groundbreaking advancement in assistive technology for those with speech impediments or impairments. By embracing unique speech patterns or original speech sounds (which may or may not even sound like the word the user is trying to say) and leveraging intelligent algorithms, this disclosed technology empowers individuals to communicate effectively and confidently in various social and professional settings. With the handset/headset and related software, the barriers of speech impairment are diminished, fostering inclusivity, understanding, and improved quality of life for those who rely on this groundbreaking innovation.

Now, a user of this technology may sometimes desire that their impeded or impaired speech be unheard by others during use of this device order for a user of this technology to feel confident in social situations or in crowded spaces, as people stare at impaired speaker creating more stress to the impaired speaker during speech attempts in public. Accordingly, the hardware of the disclosed handset or headset features much of the technology disclosed by the patent family of U.S. Pat. Nos. 9,794,386, 9,614,945, 9,576,567, 9,525,765, 9,386,135, and 9,253,299 by Scott A. Moser et al. (These patents are incorporated by reference in their entirety). However, As illustrated by FIGS. 25A and 25B, this patented technology places a microphone 1000 (FIG. 25A) close to a speaker's mouth inside the headset's mask (FIG. 25B) or the handset's mouthpiece (FIG. 25A). In this situation, the proximity of the mouth to the microphone results in a high sound pressure level environment and distorts the electrical signal.

Normal speech occurs in the range of 50 to 70 dB sound pressure level (SPL) when measured 36" away from the speaker's mouth. While it is not unusual for sounds to exceed this range, such as the music at a concert or with construction equipment like jackhammers, normal speech 36" away from the microphone rarely does. In line with typical speech, most mass-produced microphones made at a low cost that are designed for voice recording have minimal distortion up to 110 dB SPL and cost around $1 each to produce. For a microphone to function at higher sound pressure levels (such as within the chamber of a hand or headset mentioned above and illustrated in FIGS. 0A & 0B), it must be designed with more complicated physical and electrical structure and, as a result, is more expensive to produce or have an external acoustic attenuator attached to the microphone.

Generally, the inexpensive microphones 1000 mentioned above are composed of an acoustic section, a transducer section, and an amplifier section. The acoustic section leads sound into the microphone housing and to the transducer and is primarily made up of stamped metal or formed plastic components. The transducer section converts the sound to an electrical signal and is typically constructed with batch processed of materials and sometimes employs semiconductor techniques. Finally, the amplifier section takes the electrical signal and amplifies it and is also often formed using semiconductor processes. Amplifiers use basic circuitry with a single field effect transistor that is configured in a common drain or common source configuration. These amplifiers are usually powered with as few as 0.9 volts, and rarely exceed three volts.

When these inexpensive microphones 1000 are exposed to loud sounds, the amplifier is generally the component that prevents a clear recording. The amplifier's restricted power supply and diode junctions restrict the acoustic input to about 110 dB SPL. On the other hand, the acoustic and transducer components can handle acoustic levels of at least 140 dB SPL and up to 160 dB SPL at high fidelity.

Microphones 1000 can be designed to overcome amplifier limitations, but the increased physical and electrical complexity drastically raise the price to manufacture to a point where it is not a reasonable solution. Therefore, an ideal solution is an inexpensive acoustic attenuator that can be used with an inexpensive microphone to allow use in high SPL environments without appreciable distortion.

High SPL environments frequently exceed microphones' 110 dB SPL limit either by loud sounds or sounds being near the microphone. When calculating sound levels, every time the distance between the mouth and the microphone halves, the sound pressure level doubles. Sound follows a $1/r^2$ law, where decreasing the distance from 36" to 1" results in an increase of about 30 dB in a free-field environment. SPL increases of this amount moves a normal speaking voice up to 100 dB SPL, which frequently crosses most microphones' 110 dB SPL distortion threshold.

Additionally, when in a small, closed environment, such as having the microphone 1000 enclosed and placed against the mouth as described above and shown in FIGS. 0A and 0B, the sound pressure level will be even higher and changes the necessary calculations for the sound pressure level. Specifically, an environment is small when the largest dimension of the enclosure is less than 25% of the frequency's ($f_o$) wavelength (λ). The wavelength can be found by dividing the speed of sound (c), which is 344,000 mm/sec, by the frequency, or $\lambda=c/f_o$. For example, a normal speaking volume in a closed space could result in a sound pressure level as much as 4.5 orders of magnitude higher than in an open space. When under the calculated frequency, the volume can be represented by a lumped parameter model approach where the pressure is equalized in the enclosure but periodically varies, similar to the performance of an acoustic attenuator. Below the frequency, there is no standing wave, which could be interpreted as the attenuator's walls being anechoic. As the frequency increases, the lumped parameter model transitions to a waveguide interpretation for sound pressure within the attenuator.

Both the human voice and a speaker are best modeled as a current source in series with a network, and the element representing the load where sound pressure is measured depends on whether the sound is broadcast to an open space or constrained. When in closed space as identified above and illustrated in FIGS. 0A and 0B, the sound pressure level will be orders of magnitude higher than in open space because the energy is confined to a very small volume of air. For example, in open space, sound recorded 36" away from the source with a frequency of 100 Hz would have 50-70 dB SPL. When the same force is applied in a closed volume of about 2.4 cubic inches, there is a 90 dB SPL increase, which ranges from 140-160 dB SPL.

160 dB SPL is approximately the same sound level as being near an active jet engine, which is both dangerous to the human ear and difficult for a microphone to record without distortion. To protect people or use a microphone without the high sound pressure level overloading it, some common solutions are using active ear protectors or passive ear protectors. Active ear protectors use electronic level converters to convert the signal from an external microphone to an internal speaker placed within the ear canal while reducing the sound to acceptable levels. These active protectors are both expensive and require a large amount of extra technology beyond a single common microphone. On the other hand, passive ear protectors essentially function like acoustic attenuators, using a diaphragm and a volume to tailor the frequency response shape like the open ear does. However, passive ear protectors are generally large, bulky, expensive, and difficult to keep clean due to their direct contact with the external environment and the open ear.

Accordingly, a need exists for an acoustic attenuator with a flat frequency response that has a method to change the attenuation level, has a broad attenuation, is adjustable, and can be manufactured at low cost.

A microphone 1000 converts sound energy to electric energy in a linear, one-to-one translation up to a maximum input signal level. When the maximum input signal level is exceeded, the electrical output is distorted. The distortion can either be harmonic distortion or intermodulation distortion, and both can reduce speech intelligibility or speech or music quality.

Harmonic distortion occurs when a pure tone is deformed when it is transformed from an acoustic to electric signal, or from electric to acoustic signal. The pure tone's harmonics are introduced to the output and accompany the pure tone.

Intermodulation distortion occurs when at least two tones are present and the level of one tone, often the lower frequency, is much higher than the other. The first higher frequency tone's level is low enough that that no harmonic distortion would occur, although the presence of the second lower signal periodically affects the first signal's tone according to the frequency. As a result, the first signal's harmonics vary in level with time, and could become distorted even if the second signal is not within audible range.

Both types of distortion can be prevented by either making the microphone's operational sound pressure range as large as possible or by reducing the incoming signal's sound pressure range without changing the frequency response shape before it reaches the microphone.

A microphone's 1000 operational sound pressure range is limited both by the transducer's mechanical displacement boundaries such that it transitions from a linear to a non-linear operation as it approaches those boundaries and the microphone's 1000 pre-amplifier, usually located within the microphone housing. The transducer usually provides an exceptionally low power electrical signal. The pre-amplifier must boost that signal's power by increasing the output electrical current, increasing the electrical voltage, or increasing both.

Because of size constraints, the microphone 1000 is often powered by a battery or single cell. When the microphone 1000 encounters a high sound pressure level, the electrical signal swing may exceed the power supply's limits. To minimize the risk of exceeding the power supply, good amplifier design centers the dormant operating point midway between the power supply voltage and ground. Additionally, when in high SPL environments, good microphone design also attenuates the transducer's internal electrical signal before reaching the pre-amplifier stage but may compromise the microphone's signal to noise ratio. However, compromising the signal to noise ratio may be permissible by either having the design with a high initial signal to noise ratio to overcome internal attenuation or when the desired acoustic input signal is in the microphone's elevated range.

When discussing signal to noise ratio, noise is an unwanted signal. Microphone 1000 noise can either be internal or external. Internal noise is the electrical output of the microphone without any acoustical input, or noise created from within the microphone itself. Internal noise is usually measured in an anechoic chamber and is defined in terms of the equivalent SPL as an acoustical signal that would produce that microphone's output noise signal. Internal noise is usually given in decibels relative to the lowest sound pressure level a young human could hear. Internal noise is usually an exceptionally low level, where one Pascal is a microphone's common signal level and is 94 dB above this internal noise referent level, which is a factor of over 50,000 to 1.

The external noise is what the microphone 1000 picks up when exposed to unwanted sounds. For example, a singer's microphone singer picks up her voice as the wanted signal, and any picked up from the audience would be the external noise. The signal to noise ratio for the singer is the ratio as measured in decibels between her voice and the sounds of the crowd, measured separately.

External noise is often not controllable from the microphone's 1000 position, like the singer not being able to control crowd noise. However, singer's sound energy measured by the microphone, her voice, varies as the inverse square of the distance from her mouth to the microphone's sound inlet. Accordingly, the sound energy of her voice at 1" from her mouth, compared to the level 36" away, is 31 dB higher than it would be at a distance. Therefore, to maximize her voice over the crowd's noise, she should place the microphone as close to her mouth as possible. This open exposure scenario will be Example A.

A second possibility is the speaking person is talking into a small, enclosed space, such as a protective mask. Here, there is no inverse square signal drop off, but the signal level in the enclosure is inversely proportional to the enclosed volume. This usually produces a sound pressure level higher than in the previous open example with a singer and crowd.

In both examples the sound pressure level could be high enough to overload the microphone depending on the proximity to the mouth and the enclosure's size, respectively. These variables may not be controlled, and the sound pressure level may vary over some broad range.

Prior art exists that have attempted to solve these issues but have failed to adequately provide a precisely controlled microphone acoustic attenuator. U.S. Pat. No. 4,584,702 by Walker discloses a noise cancelling device that attenuates noise but does not alter the normal sound amplitude. U.S. Pat. No. 4,773,091 by Busche discloses a noise-cancelling microphone, although the signal attenuation is achieved with an electrical resistor instead of a diaphragm. U.S. Pat. No. 5,473,684 by Bartlett discloses a second order directional microphone that uses the sound field's spatial variation to reduce sound pickup from unwanted directions. U.S. Pat. No. 5,539,834 by Barlett also discloses a second order directional microphone. U.S. Pat. No. 7,783,034 by Manne discloses a non-rigid privacy mask using a microphone mounted in a tube, although fails to discuss the tube's acoustical purpose or signal attenuation. U.S. Pat. No. 9,118,989 by Zukowski discloses a directional microphone. U.S. Pat. No. 9,596,533 by Akino discloses a close-talking directional microphone. U.S. App. 2005/0135648 by Lee discloses an acoustic filter created by multiple plates with etchings. The filter attaches to a microphone and changes the microphone's frequency response. U.S. App. 2010/0067732 by Hachinohe discloses a similar acoustic filter created by multiple etched plates. WO1989/00410 by Lynn discloses an acoustic filter microphone cup which is designed to alter the microphone's frequency response. The prior art generally focuses on altering microphone's frequency response instead of attenuating all sound equally coming into the microphone.

Accordingly, a need exists for an attenuator that could be inexpensively produced and attached to an existing microphone. A further need exists for acoustic attenuators that could be purchased for multiple different microphones in attenuation steps up to some maximum level. A further need exists for an attenuator that could be continuously adjustable from some minimum level up to a maximum level.

SUMMARY OF THE INVENTION

In view of the foregoing, an object of this specification is to disclose an assistive device for rehabilitating or treatment of speech impediments where the device includes an acoustic attenuator for a microphone.

It is a further object of this disclosure to specify an assistive device for rehabilitating or treatment of speech impediments where the device includes an acoustic attenuator for a microphone that is an enclosure for the microphone.

It is a further object of this disclosure to specify an assistive device for rehabilitating or treatment of speech impediments where the device includes an acoustic attenuator that is precisely controlled to account for various different sound pressure levels.

It is a further object of this disclosure to specify an assistive device for rehabilitating or treatment of speech impediments where the device includes an acoustic attenuator that is resistant to, and shields the microphone from, debris, moisture, and harmful gases.

Other objectives of the disclosure will become apparent to those skilled in the art once the invention has been shown and described.

In view of the foregoing, what is disclosed may be an assistive device for rehabilitating or treatment of speech impediments where the device includes a passive acoustical attenuator for a microphone, said acoustical attenuator combining attenuation to lower a sound level of a sound introduced into the microphone with physical protection for the microphone, said acoustical attenuator defined by a an enclosed volume of space bounded by a sound inlet at the proximate end, containing a diaphragm structure and bounded at the distal end by a sound outlet sealed to a microphone, wherein the sound entering at the proximate inlet is reduced in level according to the divider effect of acoustical compliances of the diaphragm and the enclosed volume of space that is approximately constant over a wide acoustical range of speech. An alternative attenuator may have a situation where the microphone to which the attenuator is attached is miniature to sub-miniature in size. In yet another embodiment, an attenuator as could feature a diaphragm structure that is removable and replaceable. A different attenuator could be reduced in net size for the same attenuation by the use of two attenuator sections.

What is disclosed may also be an assistive device for rehabilitating or treatment of speech impediments where the device includes a precisely controlled microphone acoustic attenuator comprising:

- an attenuator collar;
- an attenuator shell;
- a microphone adapter ring;
- a diaphragm assembly; and,
- a circular collar.

In this preferred embodiment, the diaphragm assembly may comprise:

- A diaphragm stepped shoulder;
- A diaphragm flange; and,
- A diaphragm film.

In use, the disclosed technology may define a method for assisting or correcting speech impediments via an assistive device wherein the device features a precisely controlling microphone acoustic attenuator comprising:

- obtaining a microphone acoustic attenuator;
  - said attenuator comprising:
  - an attenuator collar;
  - an attenuator shell; and,
  - a diaphragm assembly;
- calculating the precise amount of desired attenuation;
- attaching the acoustic attenuator to a microphone; and,
- sealing the acoustic attenuator to the microphone.

In the preferred method, the attenuator collar could further comprise an attenuator sound inlet within the attenuator collar.

The disclosure may also provide an assistive handset designed to address the communication challenges faced by individuals with speech impairments. Through a combination of specialized hardware and intelligent software, this handset suitably enables real-time association of the user's impaired speech with corresponding intelligible output. In one embodiment, the device consists of a handset equipped with a mouth covering that houses an advanced microphone technology discussed above, an analog matching circuit, and a Bluetooth chip. The user, in use, speaks into the mouth covering with an impediment, and their voice is converted into an electrical signal, which undergoes a series of signal conditioning stages to enhance clarity and eliminate noise. The mouth covering also shields the microphone from picking up ambient noise that would contaminate the impaired voice pickup. The processed audio signal is wirelessly transmitted to a connected cell phone, laptop, or other compatible device running the compatible software. The software incorporates an impaired speech assistance training/interpretation module and a user voice recognition database. The user's previously recorded renditions of unintelligible or partially intelligible vocabulary words, and a correct computerized rendition, form the foundation of the database. When the user speaks partially intelligible or non-intelligible words into the handset, the software compares their speech to the database, accurately interpreting or rehabilitating their intended message. The software produces multiple output options wherein the speech may be converted into written text for display or use in a notepad-like section of the software or various known applications such as emails and messaging platforms. Additionally, the software can automatedly generate a pronounced, generated voice that is transmitted back to the handset via Bluetooth or other connection. The intelligible audio signal representing the computer-generated voice is emitted from the handset's external front facing positioned speaker, enabling real-time communication with others. Alternatively, the software could also transmit of the generated voice signal through wireless communication channels, such as during cell phone calls, VOIP or computer-based calls. This feature suitably enables live conversations over the phone, where the listener hears the computer-generated voice, eliminating the need for traditional phone calls where the listener has to contend with impeded speech. In some embodiments, the output computer-generated speech or text can be in the user's or any other language.

In summary, the assistive handset rehabilitates communication for individuals with speech impairments via advanced hardware like microphones and intelligent algorithms. Users are enabled to overcome barriers, regain confidence, and engage in effective, real-time communication with others and participate in society. This disclosure provides a significant breakthrough in assistive technology, enhances inclusivity and improves quality of life for those with speech impediments.

BRIEF DESCRIPTION OF THE SEVERAL VIEWS OF THE DRAWINGS

The manner in which these objectives and other desirable characteristics can be obtained is explained in the following description and attached figures in which.

Figure 1A:
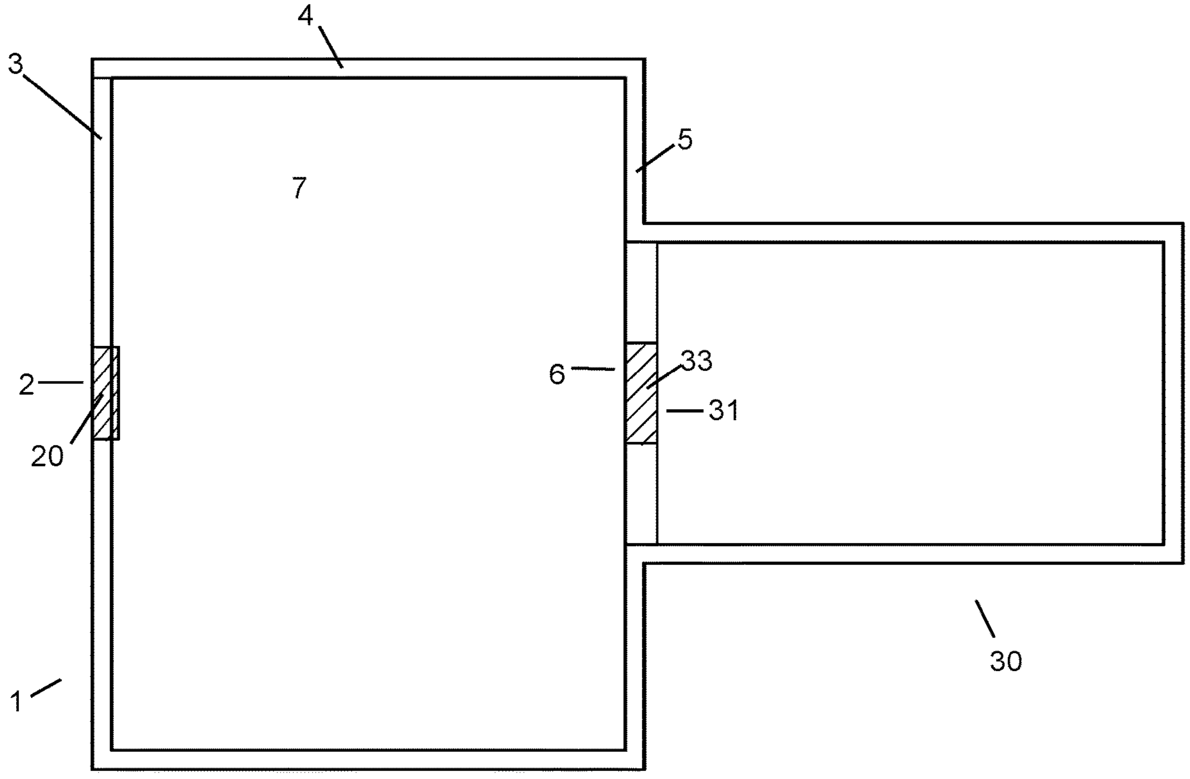
FIG. 1A is cross-sectional view of an embodiment of an acoustic attenuator.

In the drawings, the following reference numerals correspond with the associated components of the acoustic attenuator:

1—acoustic attenuator;
2—attenuator sound inlet;
3—attenuator collar;
4—attenuator shell;
5—microphone adapter ring;
6—attenuator sound exit;
7—enclosed volume;
20—attenuator diaphragm assembly;
21—diaphragm pocket;
22—stepped shoulder;
23—slot;
24—flange;
25—diaphragm film;
30—microphone;
31—microphone sound inlet;
32—microphone wiring;
33—microphone diaphragm;
34—microphone coil;
35—microphone magnet;
40—circular collar.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Generally disclosed is an assistive device for rehabilitating or treatment of speech impediments where the device includes a precisely controlled microphone acoustic attenuator with protective microphone enclosure. In use, the attenuator may be disposed in a telephone handset and be used for voice to text dictation. In the preferred use, the attenuator with protective microphone enclosure may be used to assist users with impaired speech to communicate more effectively. The details of a preferred embodiment of an attenuator are described in connection with the figures.

FIG. 1A is a cross-sectional view of one embodiment of the acoustic attenuator 1. The embodiment features an acoustic attenuator 1 connected to a microphone 30 to passively decrease the sound pressure level of incoming sounds to minimize distortion on the output. The acoustic attenuator 1 is defined by an attenuator sound inlet 2, attenuator collar 3, attenuator shell 4, microphone adapter ring 5, attenuator sound exit 6, acoustic volume 7, attenuator diaphragm assembly 20, and microphone 30. The preferred embodiment of the acoustic attenuator 1 and its components is composed of metal, although alternative embodiments can be made of plastic or other material that is low in cost to manufacture, easy to stamp and mold, and sufficiently insulated against both sound waves and environmental hazards that could potentially damage a microphone. The microphone 30 is defined by a microphone sound inlet 31, microphone wiring 32, microphone diaphragm 33, microphone coil 34, and microphone magnet 35. When the attenuator 1 is attached to the microphone 30, sound, such as a human voice, first enters through the attenuator sound inlet 2, or diaphragm slot 3, and the attenuator diaphragm assembly 20. The diaphragm 20 passively reduces the sound pressure level as the sound passes through the diaphragm 20 into the interior of the attenuator 1, or the acoustic volume 7. The diaphragm assembly 20 is set in diaphragm slot 23 of the attenuator collar 3; the attenuator collar 3 is the outward-facing component of the acoustic attenuator and makes up the front plate of the attenuator shell 4. The sound moves through the acoustic volume 7 to the attenuator sound exit 6, which is opposite the attenuator sound inlet 2, and through the microphone diaphragm 33 and microphone sound inlet 31 to have the microphone translate the sound from mechanical to electronic signal.

Figure 1B:
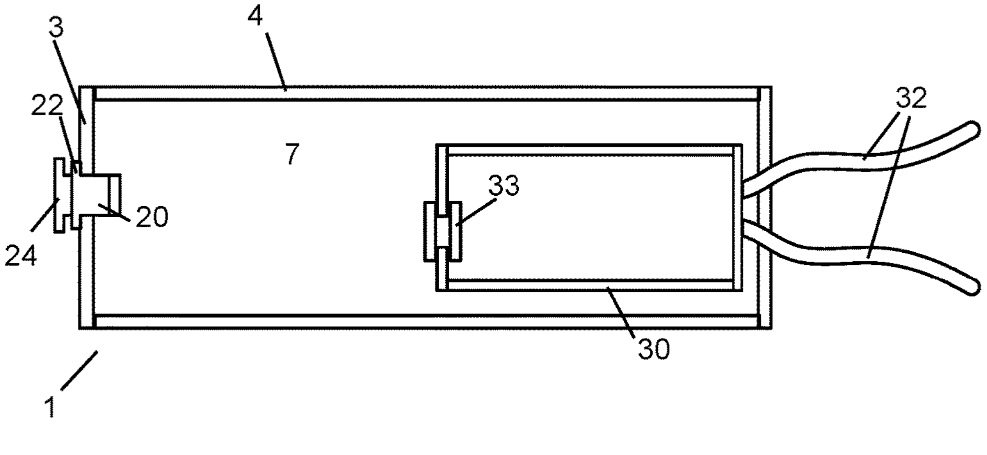
FIG. 1B is a cross-sectional view of an acoustic attenuator with a microphone fully enclosed.

FIG. 1B is a cross-sectional view of another embodiment of the acoustic attenuator 1 where the microphone 30 is placed within the acoustic volume 7; FIG. 1B has similar components and functions to FIG. 1A, with the difference being the placement of the microphone.

Figure 7A:
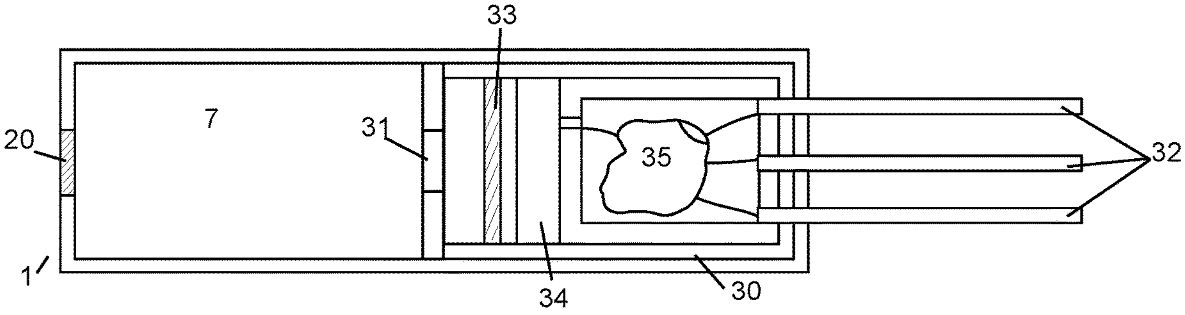
FIG. 7A is a frontal cross-sectional view of the alternate embodiment of the acoustic attenuator of FIG. 6.
Figure 7B:
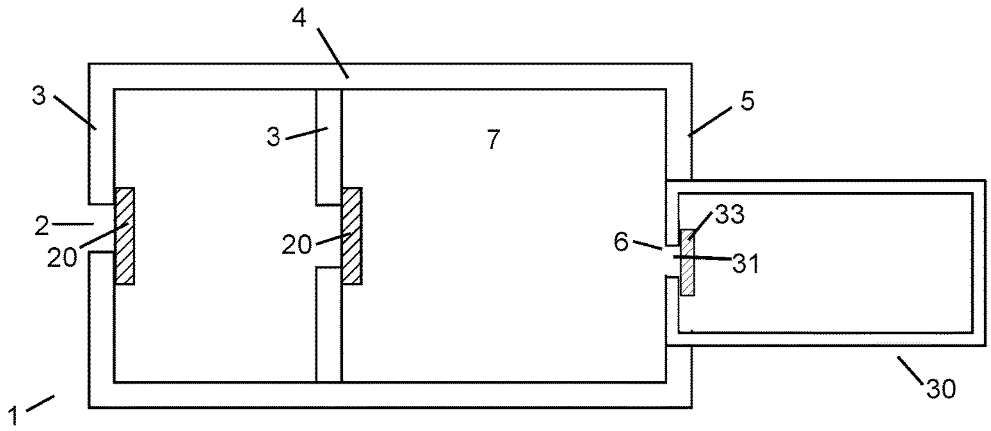
FIG. 7B is a cross-sectional view of the side of the alternate embodiment of the acoustic attenuator of FIG. 7A.

FIGS. 7B and 7A are detailed versions of FIGS. 1A and 1B, respectively. The figures illustrate two preferable embodiments that form the attenuator, although there are several other additional alternate embodiments. In FIG. 7A, the diameter of the final attenuator with a microphone is approximately the same as the microphone's diameter. If the relative compliance (capacitance) is such that Cpro is approximately equal to Ct, then the transducer diaphragm and Cpro could be identical. The relative size of Cvol to Ct is the ratio of the length of the chamber to the length of the microphone. For example, if Cvol≈Ct≈Crv, then the chamber length would be about the length of the microphone. In that case the attenuation would be about 8 dB. An alternate structure is shown by 1A. Note that the microphone is not shown in FIG. 1A but would be the same microphone structure as shown on FIG. 7A. The attenuator structure in FIG. 1A would have Cpro=10*Ct and Cvol=16*Ct. The compliance of a diaphragm is proportional to the square of the radius (and inversely proportional to the cube root of the thickness) so to achieve Cpro=10*Ct, Cpro would have a diameter about 3.16 times the diameter of the membrane used to make Ct. To achieve Cvol=16*Ct, the diameter of the circular chamber would need to be 4 times that of the microphone. Note that the in both examples the attenuation could be varied by adjusting the length of chamber forming Cvol. In FIG. 7A this could be achieved by sliding the microphone further in or further out of the sleeving. In FIG. 1A, the walls forming Cvol could be telescoped back and forth to achieve the same effect. Additionally, microphone manufacturers can make it easier to achieve Cpro Ct because they could make additional microphone diaphragms and repurpose them as Cpro. Also, greater attenuation is more easily achieved by increasing the diameter of the chamber forming Cvol, and because of this FIG. 1*a* could be preferable to FIG. 7A.

Still referring to FIG. 7A, adjusting the attenuation also adjusts the sensitivity of the microphone. The adjustments can achieve better uniformity from microphone to microphone because the sensitivity of the base microphones normally varies by +/−3 dB to +/−4 dB according to industry specifications. Using smaller or larger pressure relief vents and appropriate acoustic inductances and resistances for high resonances and roll offs can also provide additional frequency shaping for the microphone's response.

FIG. 7B is an alternate embodiment of an attenuator. If space is a premium, FIG. 7B teaches how to appreciably increase the attenuation without appreciably increasing the volume. FIG. 7B depicts two Acoustic Attenuators in series, where each section as the capacitance for its diaphragm and for its volume. This concatenated approach essentially doubles the volume of the attenuator, but doubles the attenuation as expressed in decibels (dB). For example, taking a 30 dB attenuator and then doubling its volume only increases its attenuation to 36 dB. To get 60 dB attenuation would require a volume about 33 times the original. However, using two attenuators in series raises the attenuation to 60 dB while only doubling the volume.

Figure 2A:
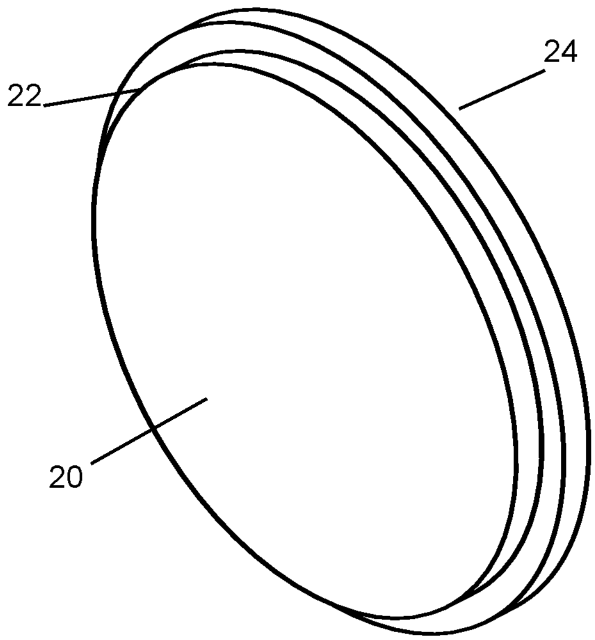
FIG. 2A is a perspective view of a diaphragm of the acoustic attenuator of FIG. 1.

FIG. 2A is a perspective view of one embodiment of the attenuator diaphragm assembly 20; the diaphragm assembly is defined by a diaphragm pocket 21, stepped shoulder 22, slot 23, flange 24, and diaphragm film 25. Suitably, the diaphragm enables passage of sound into the acoustic pocket or volume 7. In a preferred embodiment, the diaphragm assembly is composed of metal or plastic, much like the acoustic attenuator, to best be suitably molded and shaped into the necessary dimensions, although could also be composed of other suitable materials that provide similar benefits. The diaphragm film 25 is ideally composed of polyethylene terephthalate, or mylar, which is a polyester, although could also be composed of other suitable materials capable of damping incoming sounds in a similar manner. When placed into the attenuator 1, the diaphragm is inserted into the attenuator collar 3 to cover the attenuator sound inlet 2. The diaphragm assembly 20 contacts the collar 3 with the stepped shoulder 22, which, in a preferred embodiment, is affixed to the collar 3 with a dissolvable cement, although in other embodiments could be attached through removable adhesive or other means that allow the diaphragm assembly to remain closely affixed to the attenuator and prevent debris or other unwanted environmental hazards inside the attenuator or microphone.

Figure 2B:
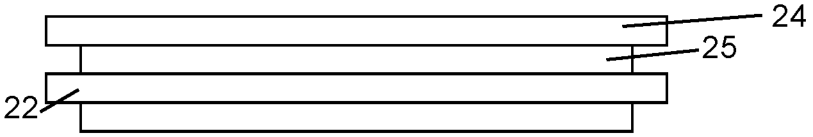
FIG. 2B is a side view of the diaphragm of FIG. 2A.

FIG. 2B is a side view of the diaphragm assembly 20. The diaphragm flange 24 faces the external environment and is opposite the acoustic attenuator 1; the stepped shoulder 22 sits between the flange 24 and collar 3. The diaphragm film 25 is attached to the flange 24 and acts as an acoustic diaphragm; the film 25 reduces the sound pressure level of incoming sounds by damping the physical vibrations created by the incoming sound, before the sound enters the acoustic volume 7 and the microphone 30. Should any portion of the diaphragm assembly 20 become compromised, the entire assembly can be removed from the attenuator by stripping the adhesive holding the assembly 20 to the attenuator 1, replacing the damaged par or the assembly as a whole, and then reaffixing the assembly to the attenuator.

Figure 3:
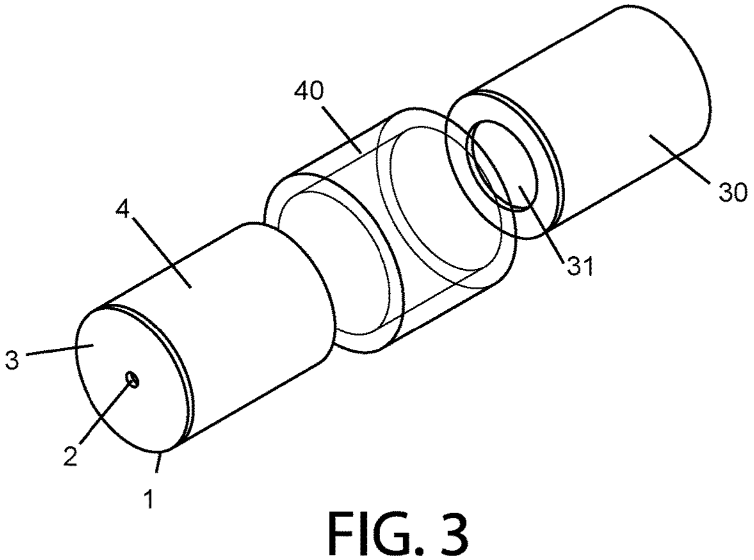
FIG. 3 is an exploded view of an alternate embodiment of an attenuator.

FIG. 3 is a perspective view of an alternate embodiment of an acoustic attenuator 1 with a microphone 30 and a circular collar 40; the circular collar 40 is an alternate method of attaching the attenuator 1 to the microphone 30 and functions as an increased acoustic volume 7, which increases the sound's attenuation before reaching the microphone sound inlet 31. In a preferred embodiment, the collar 40 is made of metal or plastic, the same material as the attenuator 1, to properly function as the acoustic volume 7, prevent sound from escaping, and be easily shaped and molded to the desired specifications, although in alternative embodiments may be made of other materials that meet these requirements. The collar 40 also allows the attenuator's sound pressure levels to be either increased or decreased by moving the microphone closer or further away from the diaphragm assembly 20 to find the ideal attenuation level before the two are sealed in place within the collar 40. When sealing the attenuator and microphone, if using a caustic adhesive such as cement, it is important to allow noxious vapors to escape to prevent damage to the diaphragm film 25; a small hole can be drilled in the wall of the attenuator to allow harmful cement vapors to escape while cement is applied. Once the cement is dried and the attenuator and microphone are affixed to the collar 40, the small hole can be filled with cement to restore use to the attenuator.

Figure 4B:
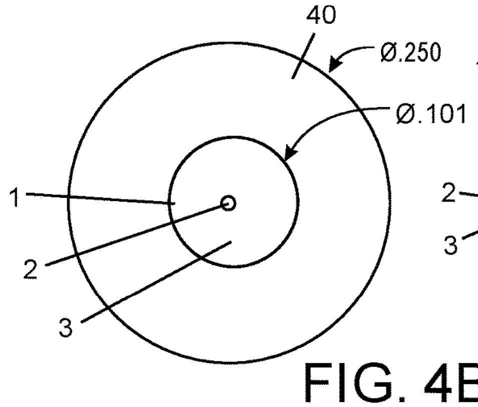
FIG. 4B is a front view of the attenuator of FIG. 4.
Figure 4C:
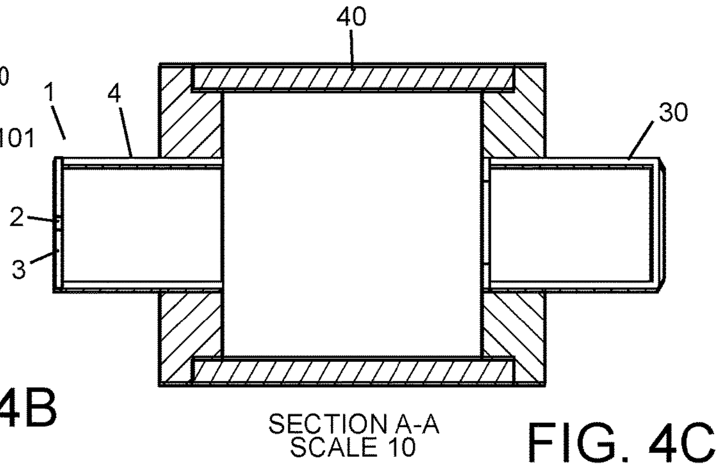
FIG. 4C is a cross section of the attenuator of FIG. 4.
Figure 4A:
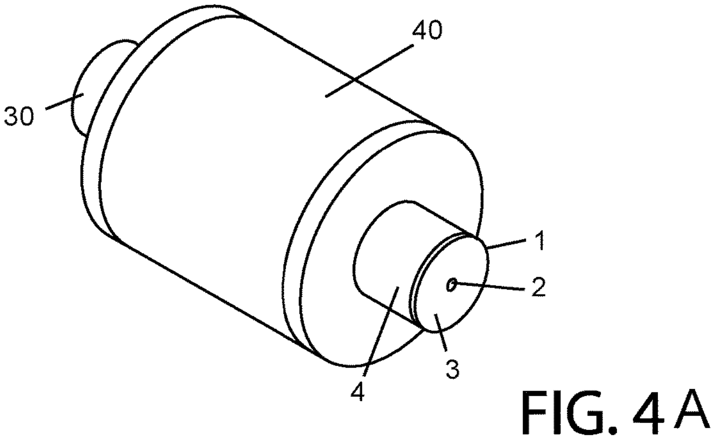
FIG. 4A is a perspective view of an alternate embodiment of an acoustic attenuator with a microphone and a cylindrical collar.

FIGS. 4A and 4B depict alternate views of the acoustic attenuator 1 and microphone 30 with the circular collar 40. Specially, FIG. 4A is a perspective view of one embodiment of the attenuator 1 and microphone 30 fixed within the circular collar 40 and FIG. 4B is a cross-sectional view of the attenuator and microphone fixed within the circular collar 40.

Figure 5A:
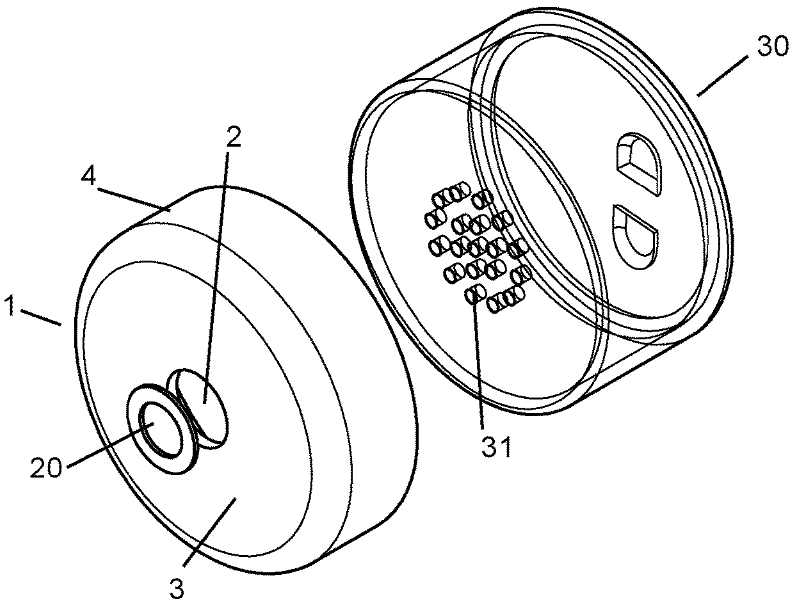
FIG. 5A is a perspective view of an alternate embodiment of an acoustic attenuator with a microphone and a cylindrical collar.

FIG. 5A is a perspective view of an alternate embodiment of the acoustic attenuator 1 showing the attenuator separate from the microphone 30 and the diaphragm assembly 20 removed; the diaphragm assembly 20 is affixed to the attenuator collar 3, to cover the attenuator sound inlet 1 to filter incoming sounds. The attenuator shell 4 is attached to the microphone 30 while leaving space between the attenuator collar 3 and microphone sound inlet 31, to form the acoustic volume 7; the microphone sound inlet 31 is placed inside the acoustic volume 7 so that the microphone inlet 31 is adjacent to the attenuator sound exit 6.

Figure 5B:
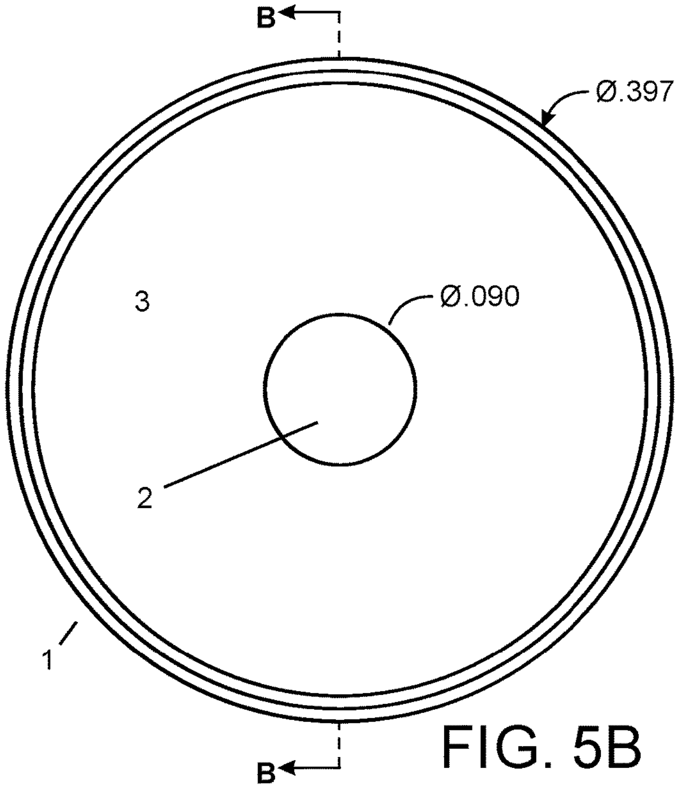
FIG. 5B is a frontal cross-sectional view of the alternative embodiment of an acoustic attenuator with the microphone and the cylindrical collar of FIG. 5A.
Figure 5C:
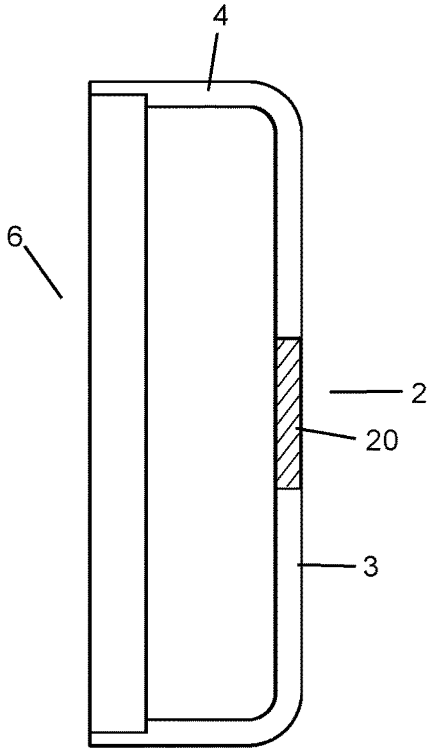
FIG. 5C is a cross-sectional view of the side of the alternative embodiment of an acoustic attenuator with the microphone and the cylindrical collar of FIG. 5A.

FIG. 5C is a cross-sectional view of the acoustic attenuator 1; the attenuator collar 3 has a space in its center to serve as the attenuator sound inlet 2, which is then filled with the diaphragm assembly 20. The space in the center of the collar 3 is preferably circular, although in alternate embodiments may be square, rectangular, triangular, or shaped in other styles that do not negatively affect the sound quality and do not add distortion. The attenuator shell 4 is attached to the edges of the microphone to form the acoustic volume 7 and to protect the microphone from debris or other harmful environmental conditions such as gases or humidity.

Figure 6:
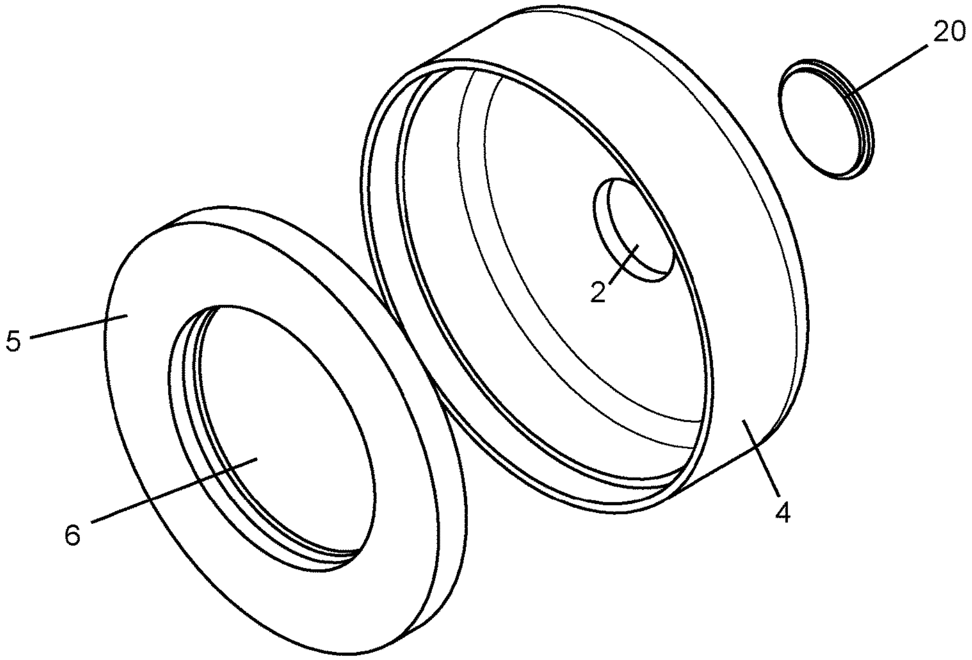
FIG. 6 is a perspective view of an alternate embodiment of an acoustic attenuator.

FIG. 6 is a perspective view of the acoustic attenuator 1 featuring the microphone adapter ring 5; the adapter ring 5 can be different sizes to allow for differently sized microphones with smaller diameters to be used with a single size acoustic attenuator 1. The microphone adapter ring 5 is preferably circular to accommodate most microphones, although in alternate embodiments may be square, rectangular, triangular, or shaped in other styles that do not negative affect sound quality and allow for consistent adhesion with a microphone. The microphone adapter ring 5 is preferably composed of identical material to the attenuator 1 it is used with to create a homogenous attenuator that will respond consistently to wear over time and any harmful external factors or environments.

Figure 8:
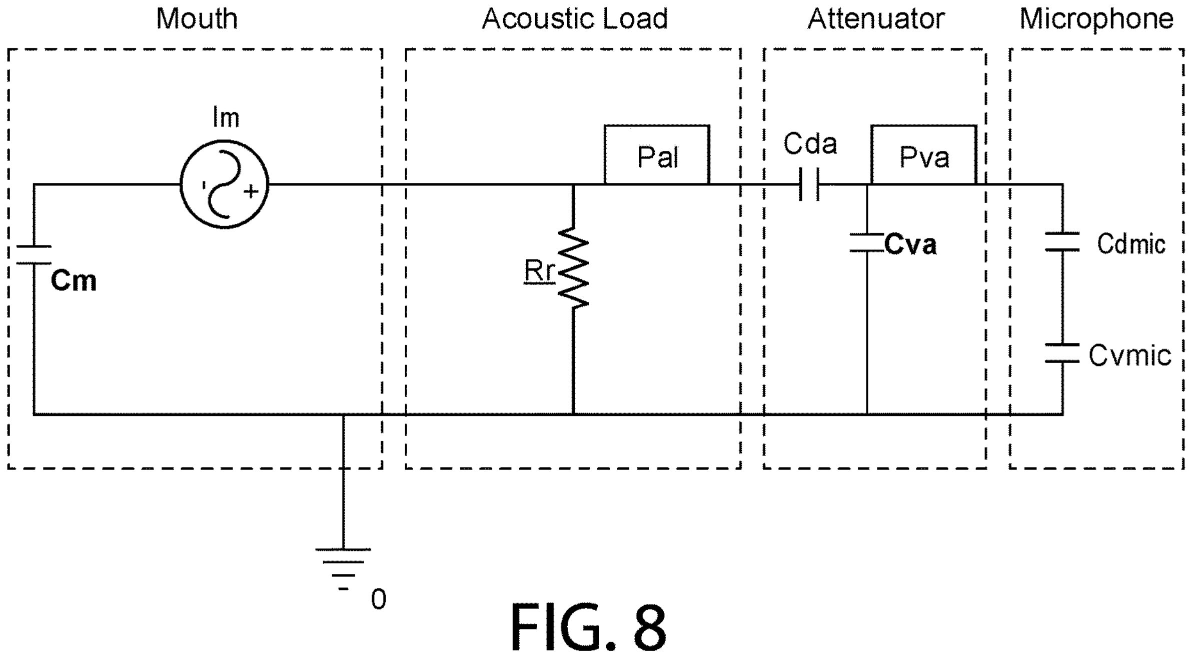
FIG. 8 is an electrical circuit diagram of the acoustic attenuator of FIG. 1 in a free-field application.
Figure 9:
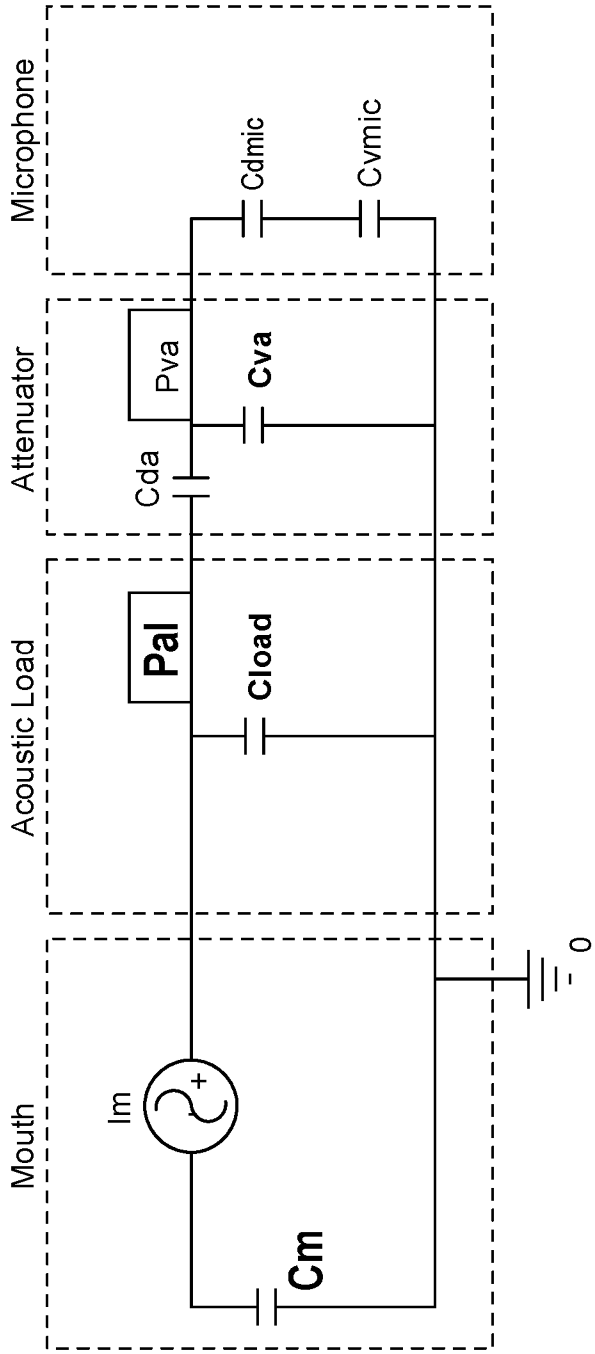
FIG. 9 is an electrical circuit diagram of the acoustic attenuator of FIG. 1 in a small volume application.
Figure 10:
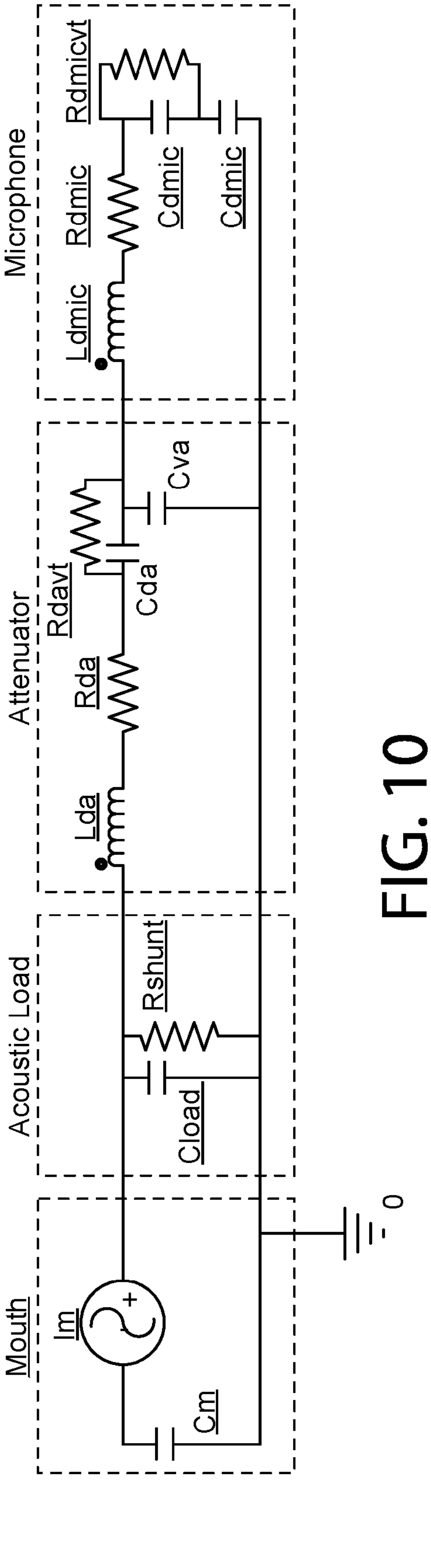
FIG. 10 is an electrical circuit diagram of the acoustic attenuator of FIG. 1 in a small volume application with potential compromises resulting from either low or high frequencies.

FIGS. 8, 9, and 10 depict basic electrical analogs for the acoustic attenuator 1 and microphone 30. FIG. 8 depicts the attenuator's use in a free field, while FIGS. 9 and 10 depict the use in an enclosed cavity with FIG. 10 additionally showing additional elements that may cause or abate performance modifications. The analogs are divided into four sections which represent, in order, the operation of the mouth, the acoustic load, the attenuator, and the microphone 30. For FIGS. 8 and 9, Cda and Cva are capacitors in series, where Cda represents a diaphragm 20 and Cva represents an acoustic volume 7. The sound pressure level, Pal, coming from the acoustic load is divided such that the sound pressure level, Pva, across Cva is reduced proportionately. The microphone 30 also possesses a microphone diaphragm 33, Cdmic, and a volume, Cvmic, in series with each other. This combination can be represented by another acoustical capacitance, Cmic, with the microphone diagram 33 in parallel with the microphone volume.

The effects of the microphone acoustical capacitances must be considered when computing the attenuation unless the microphone diaphragm's capacitance is much lower than the attenuator volume's capacitance. If this is not true or if the exact calculation is wanted, Cmic may be measured with an acoustic compliance test system, which a person of ordinary skill in the art of microphone design or acoustical test measurements can design and build. However, the acoustical capacitance of a diaphragm, like the diaphragm film 25, is difficult to pre-calculate because it depends on the diaphragm's material, geometry, and tensioning. A preferred diaphragm film 25 made of mylar is the same material used for subminiature diaphragms in electret microphones and as the insulator in electrical capacitors. Mylar is readily available in various thicknesses applicable to subminiature systems, and when metalized it forms a barrier to problematic vapors that could potentially harm the microphone or its components. The addition of the metallization layer and the additional processes of forming, clamping, or tensioning make the formula for computing the capacitance difficult to generate from a theoretical model. However, the acoustical capacitance of a diaphragm, Cadia, is generally proportional to the area and thickness of the diaphragm.

In practice, an appropriate diaphragm design procedure would be to first select the diaphragm thickness that gave the best protective properties and the diaphragm area that seemed applicable. Next, acoustic capacitance would be measured with acoustic capacitance test equipment. The capacitance value would then be used to vary the diaphragm's area to achieve the desired capacitance so that, when used with a known fixed volume, the desired attenuation would be reached. Alternately, the attenuator's acoustic volume could be varied to achieve the desired attenuation. Accordingly, the design process is very flexible.

Specifically, FIG. 8 shows the electrical analog of the transfer of sound from its generation at the human mouth, to its transition to acoustic load, through the attenuator 1, and into a microphone 30. Suitably, FIG. 8 depicts an attenuator that preferably features a 6 mm face that is oriented at the chamber's open end or attenuator's acoustic volume 7. (See, e.g., FIG. 1A or 1B.) As noted above, the preferred diaphragm assembly is in the attenuator collar 3 and could have a diameter approaching 6 mm. Since the microphone 30 may be chosen with a much smaller diameter than the chamber or acoustic volume 7, the most efficient use of the space could be to place the microphone 30 internal to the acoustic attenuator with possibly the microphone end with the terminals just protruding from the volume 7. (See, e.g., FIG. 16.) A mathematical computation shows that the microphone volume is (2.5 mm/2)2*π*2.5 mm=12.27 $mm^3$. The external dimension of the chamber is (6.0 mm/2)2*π*10.0 mm=282.7 $mm^3$. The chamber volume to microphone volume ratio is a factor of 23:1, meaning the microphone does not appreciably reduce the chamber volume. However, the acoustic volume's 7 walls must be accounted for, and the wall thickness can be assumed to be 0.25 mm. The new ratio yields an external dimension of 225.7 $mm^3$ with a ratio of 18.39:1. As noted, the diaphragm film's 25 equivalent acoustic capacitance was approximately half the volume of the microphone, 6 $mm^3$, which yields an attenuation of about 31 dB. Additionally, the frequency can be better shaped to the microphone's response using smaller or larger pressure relief vents for the low frequencies and appropriate acoustic inductances and resistances for high resonances and roll offs. While the preferred embodiment is combining the attenuator 1 with a single sound inlet microphone, or a unidirectional microphone, in an alternate embodiment the acoustic attenuator 1 could be used with a multiple sound inlet microphone by placing an extra enclosure, or enclosures, in the attenuator for each additional sound inlet. For that alternate embodiment the capacitance computations would differ but would be easily calculable by a person skilled in the art.

In FIG. 8, the simplified impedance of the human sound system is represented by a capacitance (Cm) in series with a current source (Im). The acoustic load is represented by a radiation resistance (Rr), although it is not a true resistor. Between capacitors, inductors and resistors, resistors are the only element that removes energy from the system. Rr is more a contrivance to show that energy is transmitted away from the system because the sound pressure across Rr is dissipated into open space and as such, varies as 1/x2, where x is the distance from the mouth to the measurement point, here the attenuator/microphone assembly. In other words, Rr is not a true resistor since its value depends on frequency. Without a value of Rr that is independent of frequency, if we model the human voice system emanating from the mouth as a plane piston in an infinite baffle, according to Beranek ("Acoustics", p. 124), the radiation resistor's value varies as ω2, or (2*π*f)4, up to some frequency where the wavelength is commensurate with the driver's size. For higher frequencies the acoustic resistance is comparatively flat, meaning sound pressure level for a constant value of Im will rise by 12 dB/octave=dB/decade.

FIG. 9 shows another electrical analog of the transfer of sound from its generation by the human mouth, to its transmission represented by an Acoustic Load, through the Attenuator, and then into a Microphone. FIG. 9 is comparable to FIG. 8, the difference being that resistor, Rr, has been replaced by a capacitor, Cload. Cload may preferably be a capacitor whose value is: Cload=Vload/(ρoc2). This value is the result of the formula for the capacitance of a volume. As a capacitor, its impedance will vary with frequency as 1/ω=1/(2*πf). This suitably means that, for a constant electrical current, the signal should fall with frequency at a rate of 6 dB/octave=20 dB/decade.

Figure 12:
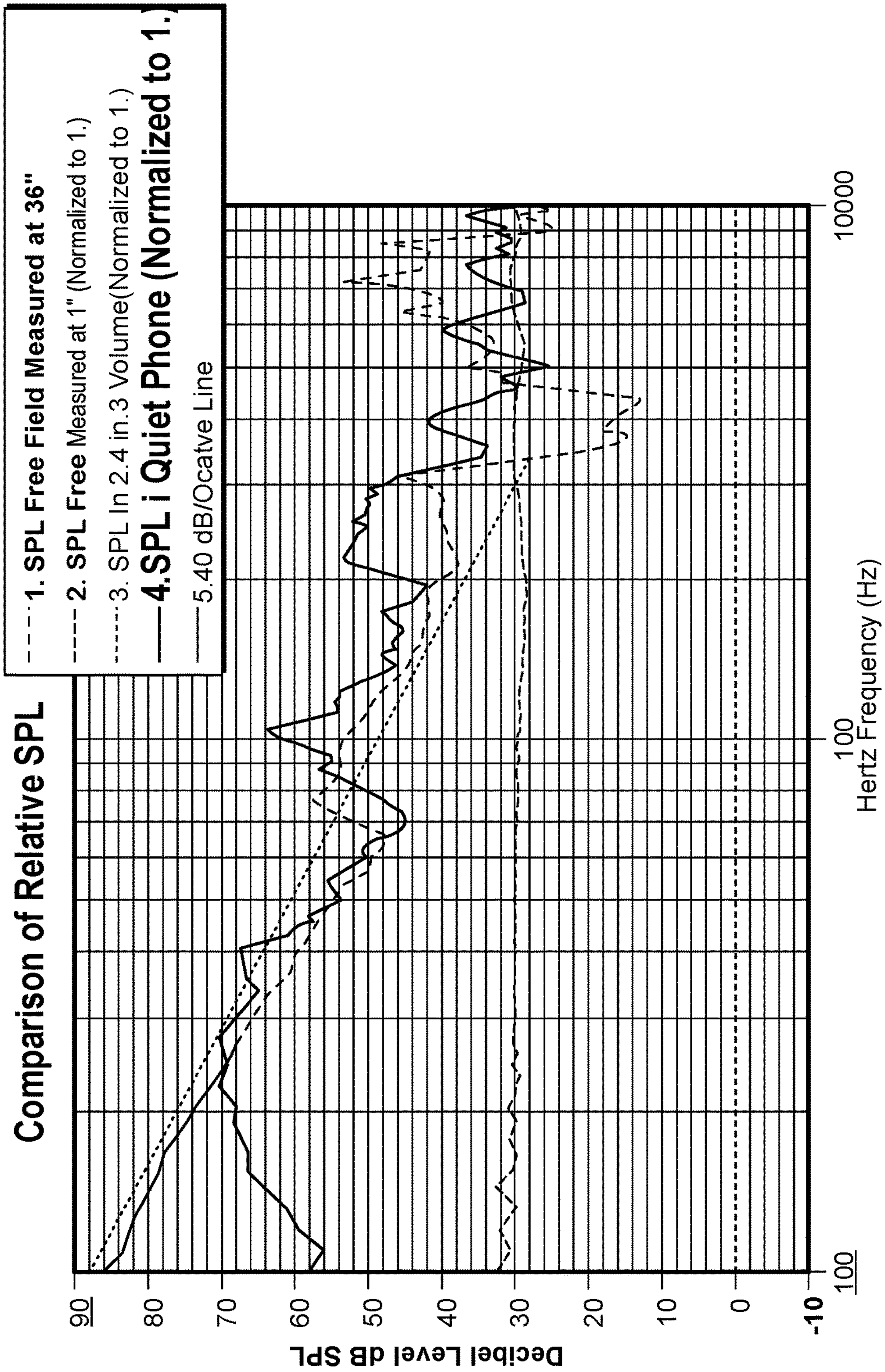
FIG. 12 is a graph showing sound pressure level at various distances from microphones with and without an acoustic attenuator.

FIG. 12 is a graph of frequency v. sound pressure level. The graph suitably compares actual measurements of the sound pressure level under different conditions as produced by the speaker for a horn driver, but without the horn itself. The size of the aperture of the speaker is 1.0". This might be suitable for a head and torso simulator (HATS) if it were equalized to a flatter response. To avoid acoustic frequency artifacts specific to the speaker chosen, the data is normalized to the sound pressure level measured at 36" for a free field. Therefore, the chart values for all frequencies in this data is set to 0 dB and has the reference number 1. The results can be compared for a free field measurement at 1" (line 2), the SPL into a 2.4 cubic volume (line 3), and into a Quietphone® (line 4) (a Quietphone® is a product by Quiet inc. and is generally described by U.S. Pat. No. 8,948,411 (issued Feb. 3, 2015) and this document and its family of patents are incorporated by reference in their entirety). The Quietphone® also has a 2.4 cubic inch chamber, but also has a side voice exhaust channel from the mouth to the ear. The final line (line 5) is for reference and shows a minus 40 dB/octave slope, matching the slope for line 3. In view of the foregoing discussion, it is possible to calculate the sound pressure level under these different conditions assuming the same driver level offset. For instance, at 100 Hz, when 50 SPL is measured at 36" to the microphone, for the same drive level, 50+30=80 SPL will be measured at 1". Accordingly, 50+86=136 dB SPL will be measured into a 2.4 cubic closed chamber, but only 50+56=106 dB SPL into the pickup.

If, however, we take into account a higher driver level so that 70 dB SPL average is recorded at 36", but assume peak readings 15 dB higher, we get a maximum drive of 85 dB SPL. The numbers are then for each line at 100 Hz: =>85 dB SPL=>115 dB SPL=>171 dB SPL=>141 dB SPL. The side channel of the Quietphone® does help, but an Acoustic Attenuator of 30 dB or more is obviously called for. With the Quietphone® side channel and the attenuator, the level would be 141−30=111 dB, which is close to a conventional miniature microphone's limit. Without the side channel into the same enclosed volume, the level is 171−30=141 dB, resulting in severe distortion.

Figure 11:
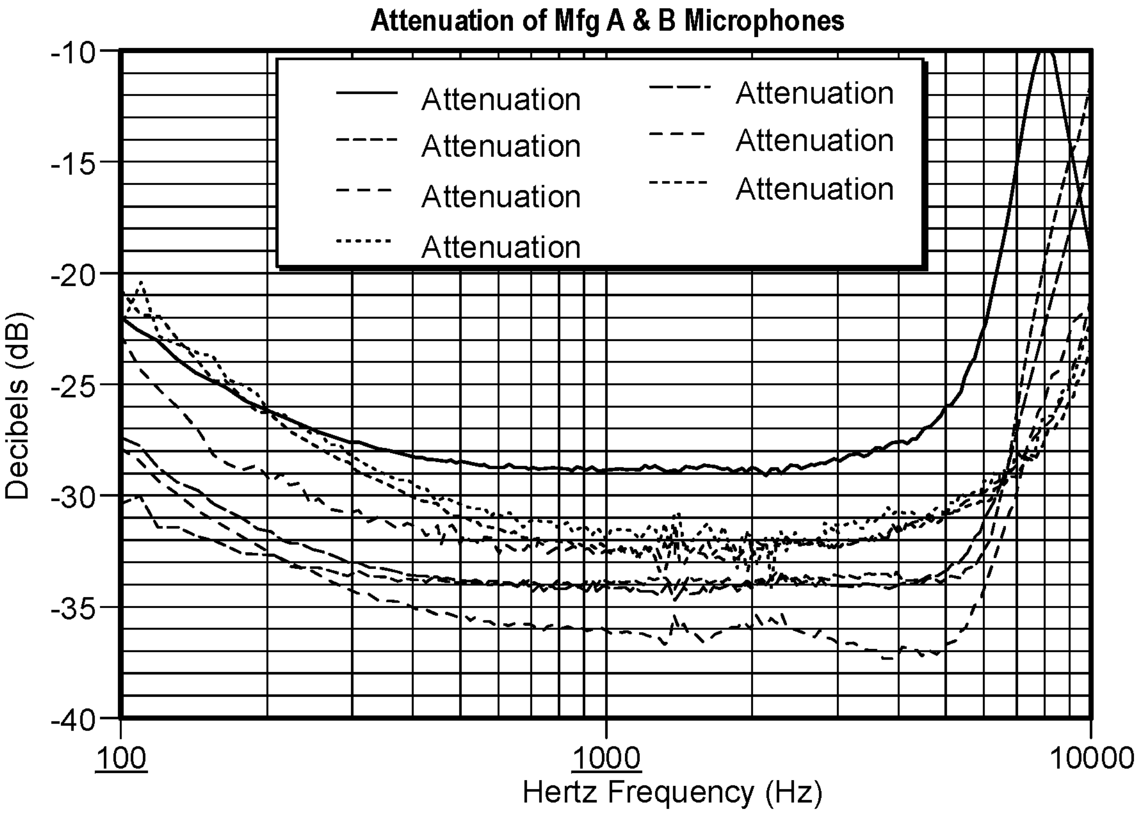
FIG. 11 is a graph showing measured attenuation of seven 30 dB acoustic attenuators and microphone assemblies made with microphones of two different dimensions.

FIG. 11 shows a graph measuring attenuation of seven 30 dB acoustic attenuators. It would be preferred that the acoustic attenuator had a perfectly flat response over the entire acoustic band of 20 Hz to 20 kHz. As can be seen in FIG. 11, there are some limitations to the attenuators discussed so far. In general, for all of the microphone/attenuator combinations shown, the attenuation decreases at both the high and low frequencies, with greater change at high frequencies. The performance shown is completely adequate for speech quality and intelligibility, covering the range 200 Hz to 8 kHz, but this range can be improved.

The simplest improvement is electrical equalization. The shape of the attenuation does differ between the two microphone models, but for the examples of the particular model, the shapes are fairly constant, so an equalization network should give a consistent performance. It is true that the overload margin for the preamplifier is decreased, but the acoustic energy for speech is predominantly in the central portion of the curve and may not be a problem. However, there are methods to improve the shape of the attenuation curve that precede the microphone.

Returning to FIG. 10, the network showing the acoustical analogs, there are additional elements that occur in the mesh, beyond those shown of FIG. 8 or FIG. 9. The ones that degrade performance are as follows:

Rdavt, the acoustic vent for the attenuator diaphragm;

Lda, the acoustic inductance leading to the attenuator diaphragm;

Rda, the resistive damping of air leading to the attenuator diaphragm;

Ldmic, the acoustic inductance leading to the microphone diaphragm;

Rdmic, the resistive damping of air leading to the microphone diaphragm; and,

Rdmicvt, the acoustic vent for the microphone diaphragm.

Suitably, the first three cause the attenuation reduction at the low and high frequencies. Rdavt bypasses the attenuator diaphragm and should be as small as possible to have acoustic impedance as high as possible. Lda causes a peaking in the response shape within the pass band of the attenuator and should be as small as possible to shift the peak above the upper end of the pass band. Rda controls damping of the peak at the attenuator and should be set to flatten that peak. The last three can be set to minimize the attenuation's degradation, and the values need to be selected essentially are as in the preceding paragraph for the respective element. Unfortunately, the only way to do this is to design the microphone or select the microphone so that those criteria are met. Designing the microphone results in a more expensive microphone. Selecting the microphone is more cost efficient given the large number of microphone manufacturers, each with very broad product lines.

Returning to FIG. 11, the graph shows the results of applying the Acoustical Attenuator to seven microphones, four from one manufacturer and three from another. The first four from manufacturer A used the Acoustical Attenuator shown on FIGS. 5 & 6 (type D). The microphones' dimensions are 9.7 mm diameter and 5 mm length for a volume of 370 $mm^3$. The last three use the same attenuator housing as on FIGS. 5 & 6 with the addition of the adaptor ring shown in FIG. 6 (type E), as the microphones from manufacturer B have smaller 6.0 mm diameters and 3.4 mm lengths mm for a volume of 96.1 $mm^3$. The volume ratio is about 4:1 for external dimensions. As can be seen in the graph, microphones from manufacturer B seemed to be more uniform than manufacturer A's, but these were prototype assemblies made over a period of time using salvaged diaphragms. It is possible that some or all of the variations are due to problems caused by the salvage operation.

Returning again to FIG. 10, as noted earlier, the diaphragm for the acoustic attenuator (Cda) protects the microphone after attaching the acoustic attenuator. Both the attenuator 1 and microphone diaphragm 33 must be protected from damage during assembly. There are two problem concerns. The first is the attaching the acoustic attenuator to the microphone. It is possible to increase or decrease the attenuator's 1 pressure by orders of magnitude than any sound pressure level the microphone or the attenuator is normally exposed to by sliding the attenuator assembly forwards and backwards, respectively. It is also possible to expose both diaphragms to the vapors of the cements. Both effects may be minimized by providing a small relief hole in the attenuator 1, open while the cements are applied to the mating parts. This allows the pressure in the attenuator to equalize while the process is done, and the cement is cured. A small dab of cement can then be used to seal this vent.

The attenuator's level of attenuation can be checked before the microphone is cemented to the attenuator because the small leaks between the attenuator and the microphone will not affect the attenuation at or above 1 kHz when the vent hole is sealed with tape. The attenuator may be removed using its flange and replaced, even if the cement is strong enough to retain the microphone to the attenuator, although in a preferable embodiment the cement bond is breakable. When the bond is not breakable, a vent hole can be created in the attenuator's face and covered by tape while the assembly is checked and possibly replaced; as discussed, the tape sufficiently seals the vent hole to not affect attenuation. After the result is satisfactory, the vent hole can be covered over with a suitable viscous cement. Suitably, if the attenuator diaphragm is damaged after the assembly and after the vent hole is sealed, the diaphragm can be replaced by peeling back the viscous cement layer and replacing the diaphragm. Furthermore, the attenuator's volume can be ensured to be accurate if positive stops are used.

Additionally, adjusting the length of the chamber forming Cvol can also vary the attenuation. For example, in FIGS. 1A and 7A this could be achieved by sliding the microphone further in or further out of the sleeving. In FIG. 4, the walls forming Cvol could be telescoped back and forth to achieve the same effect; increasing the diameter of the chamber forming Cvol easily creates greater attenuation. Accordingly, FIG. 5 could be considered preferable to FIG. 4 because of FIG. 5's greater volume.

Furthermore, adjusting the attenuation also adjusts the microphone's sensitivity. The adjustment could be used to achieve better uniformity from microphone to microphone because the base microphones' sensitivity normally varies by +/−3 dB to +/−4 dB according to industry specifications. For multi-inlet microphones, especially directional and noise canceling microphones, it is necessary to provide an acoustic attenuator for each sound inlet. It is necessary that the attenuator does not alter the level or phase of the input signals presented at each sound inlet. This is possible to achieve by matching the attenuators as they are built and then testing them to ensure good amplitude and phase match; a selection process to form a matched set is reasonable.

Figure 13:
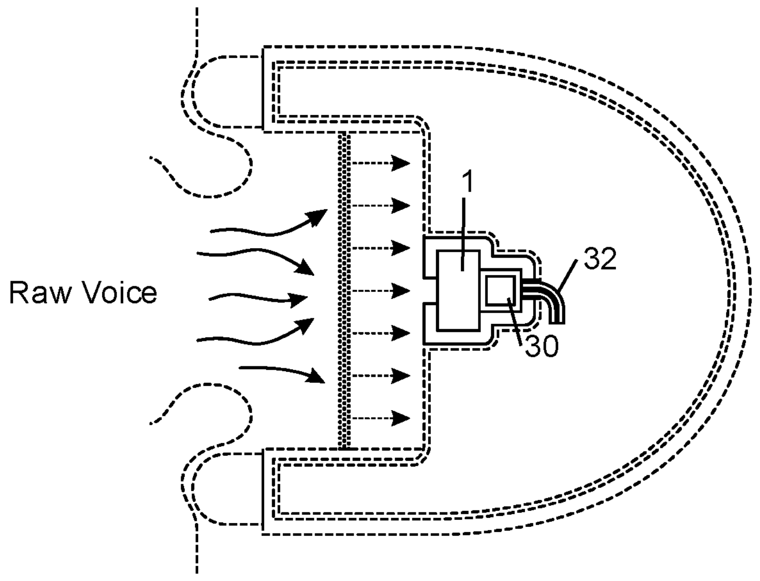
FIG. 13 is a cross sectional view of the attenuator inside a telephone handset.
Figure 14:
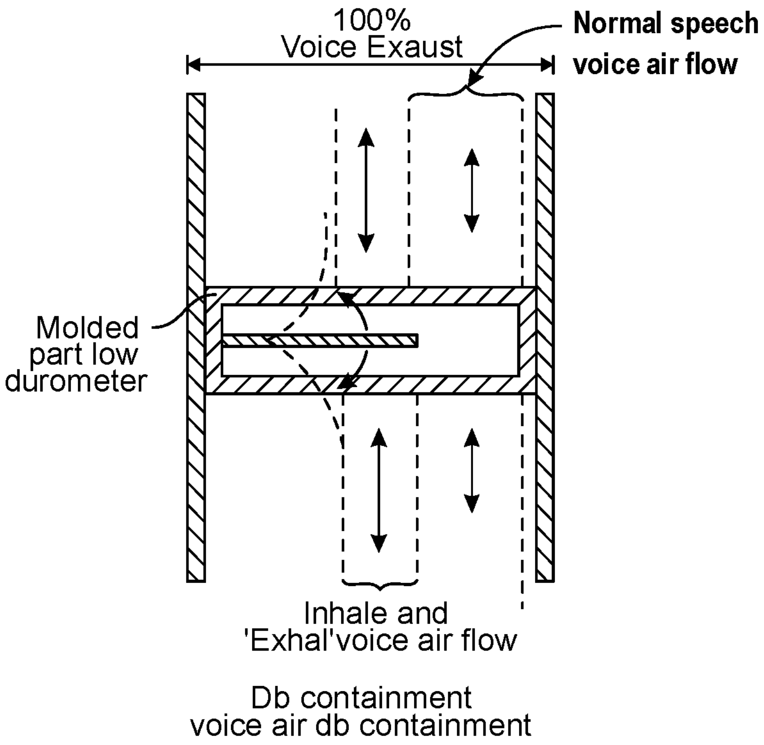
FIG. 14 is a cross sectional view of a decibel containment voice exhaust two-way voice valve.

FIGS. 13 and 14 show an improved housing for a microphone that is configured to reduce the plosive raw voice of regular or impaired speech. As shown in FIG. 14, the side channel of the Quietphone® suitably includes a low durometer voice air flow flap for exhale speech and inhale life air intake as needed for plosive words require more air flow for pronunciation. Suitably, the area for voice air intake and exhaust may be always open for normal speech and air inhalation but closed off during expression of plosive words. In other words, the flap design provides an area for the flap to open both outwardly and inwardly (both ways) and, as a result, assists with sound containment in the voice capture area of the Quietphone®. As shown in FIG. 13, a speaker's face is hermetically sealed by contact of the phone handset against the speaker's face. See also FIG. 0A or 0B. Suitably, the chamber features a hermetically sealed plosive energy screen to remove voice plosive air pressure during expression into the phone. Further shown in FIG. 13, an attenuator—30 dB substantially lowers peak to peak dB energy prior to electret microphone pickup and the attenuator is suitably surrounded by dense memory foam with slow rebound time and this further attenuates voice sounds as they attempt to escape the Quietphone®. As a result, the microphone receives sounds with a lower peak to peak electrical signal that is not distorted.

Figure 15:
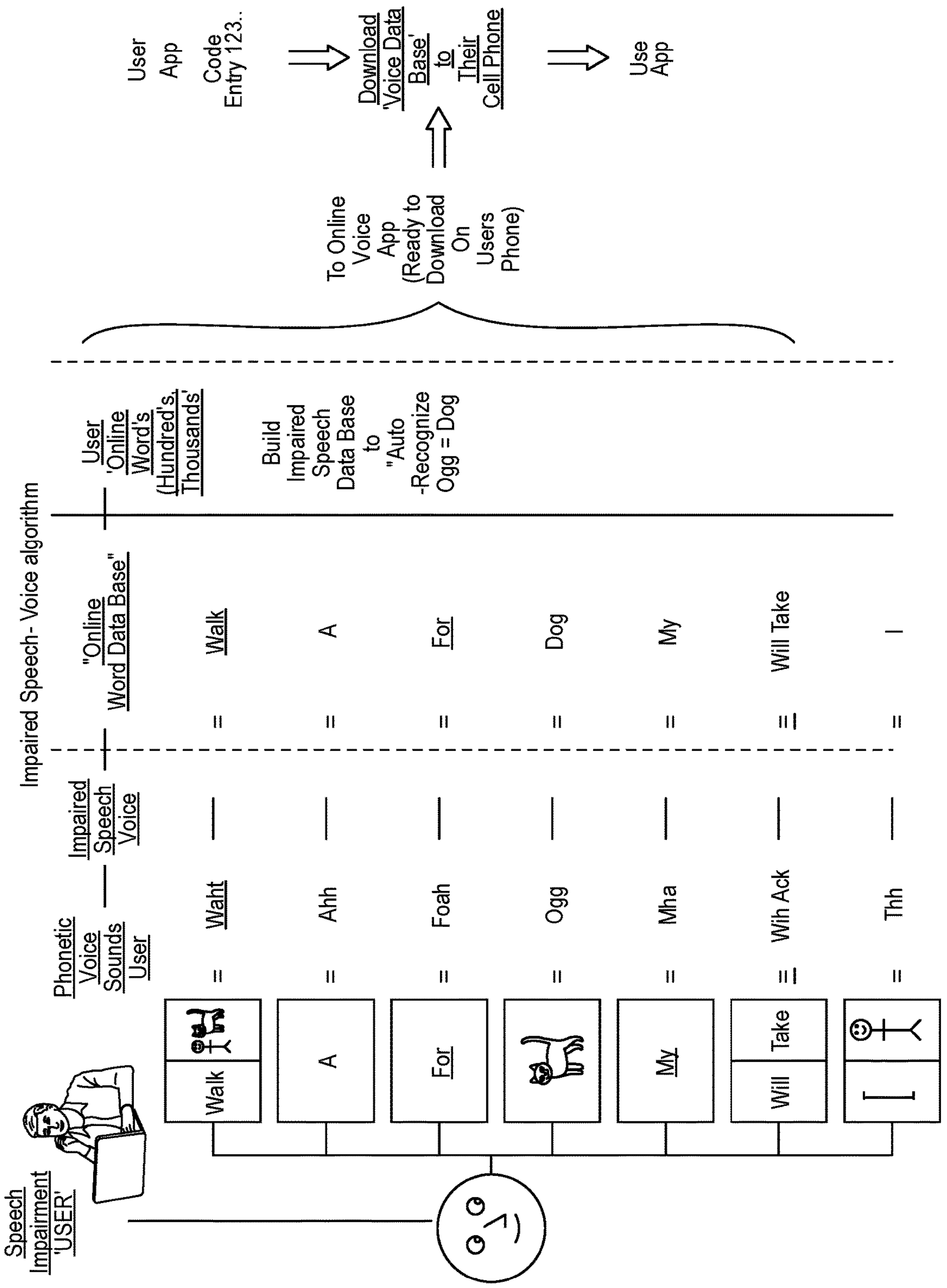
FIG. 15 is a diagram of the acoustic attenuator used with a voice algorithm to accurately translate compromised or impaired speech at a close distance to the microphone.
Figure 16:
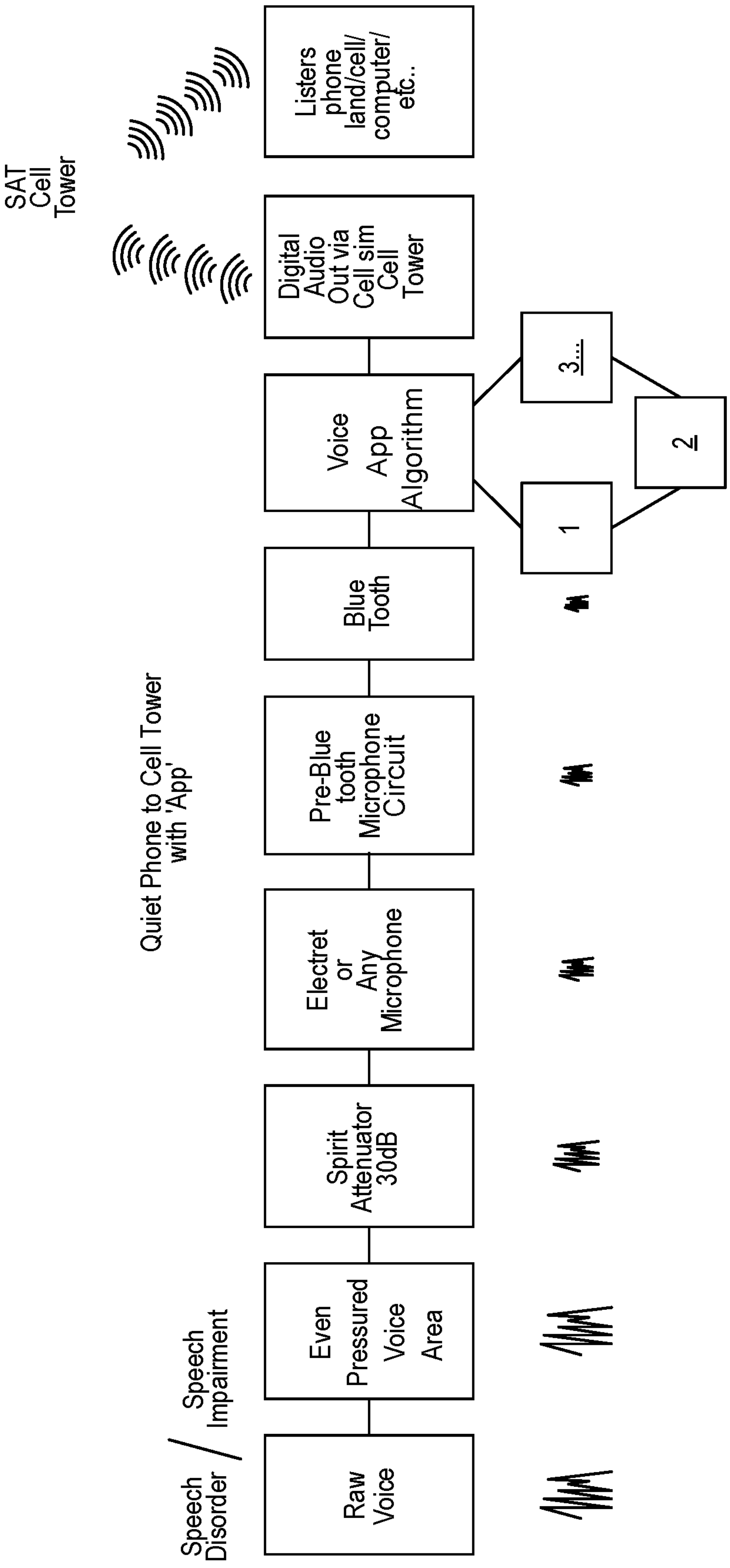
FIG. 16 is a flowchart with the voice algorithm to translate speech from raw voice input to digital output.
Figure 17:
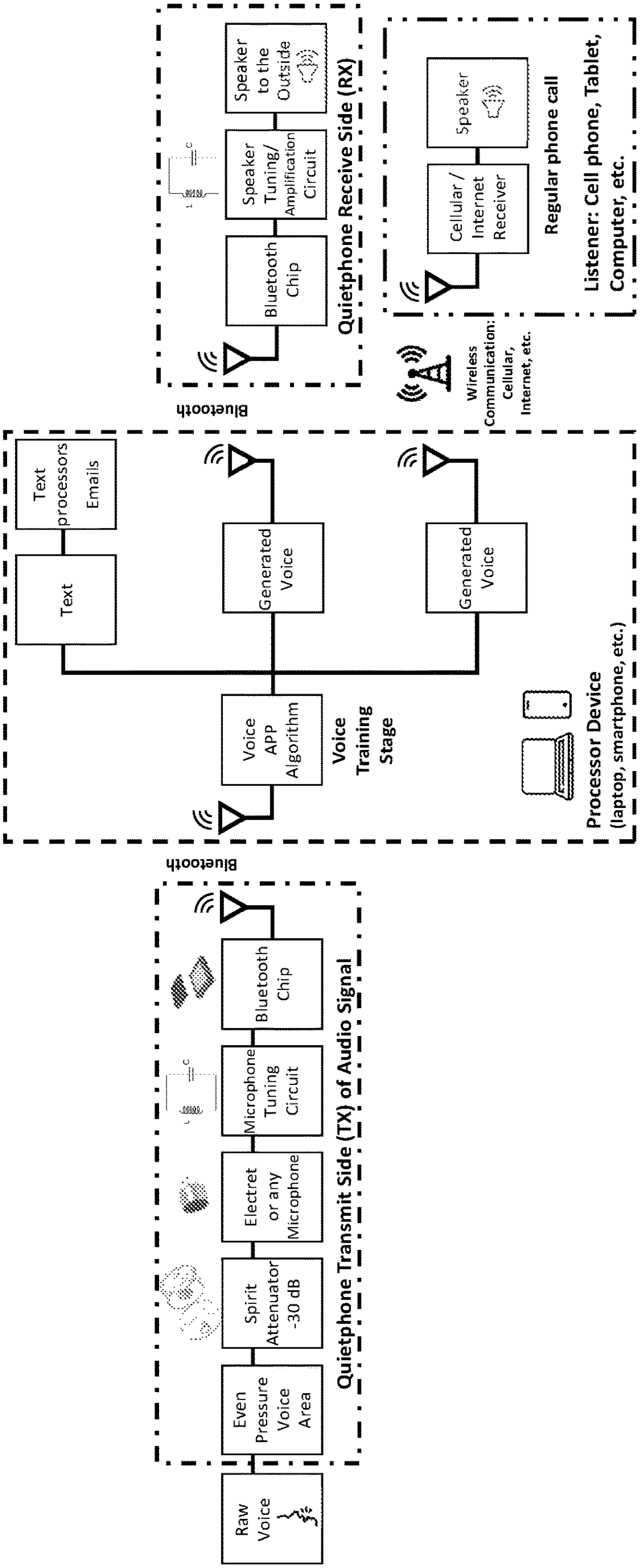
FIG. 17 is a second flowchart with the voice algorithm to translate speech from raw voice input to digital output.
Figure 18:
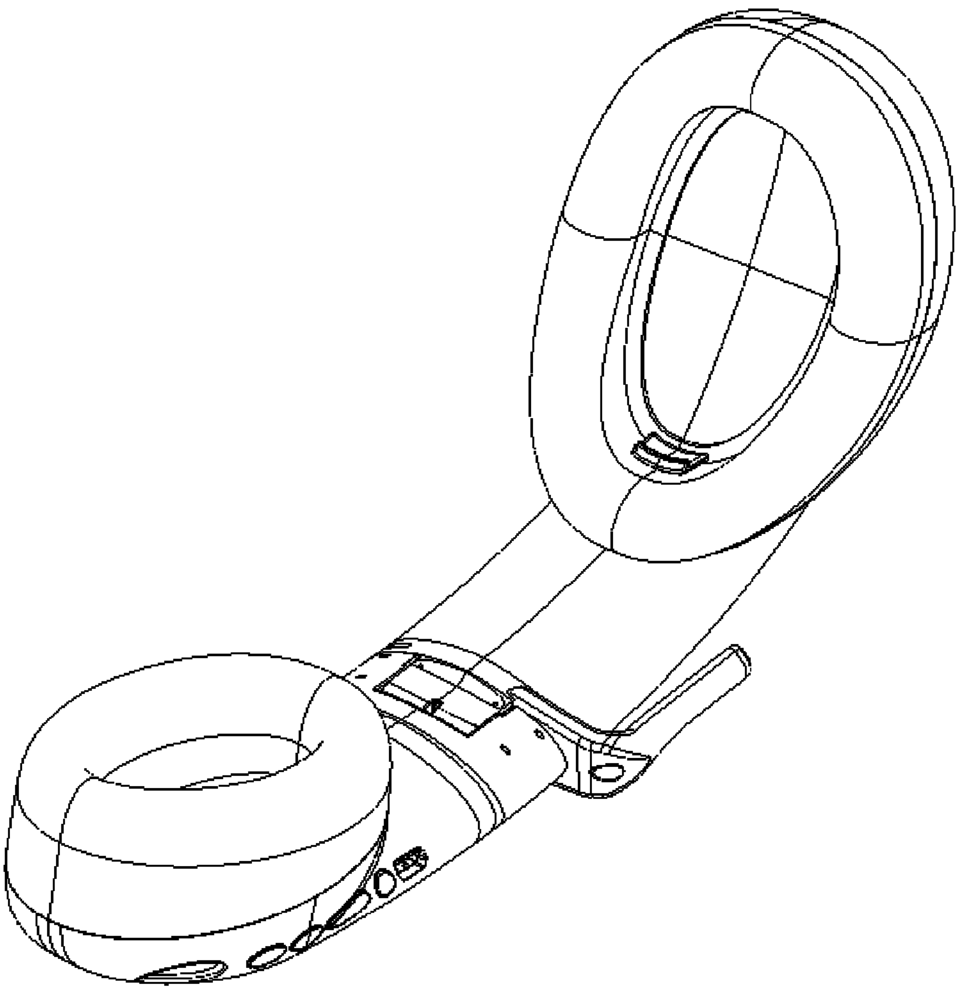
FIG. 18 is a perspective view of a preferred embodiment of a assistive handset for rehabilitating a speech impediment.
Figure 19:
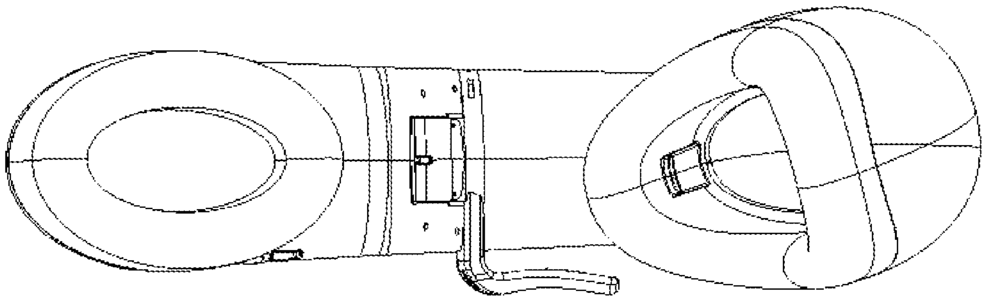
FIG. 19 is a front view of a preferred embodiment of a assistive handset for rehabilitating a speech impediment.
Figure 20:
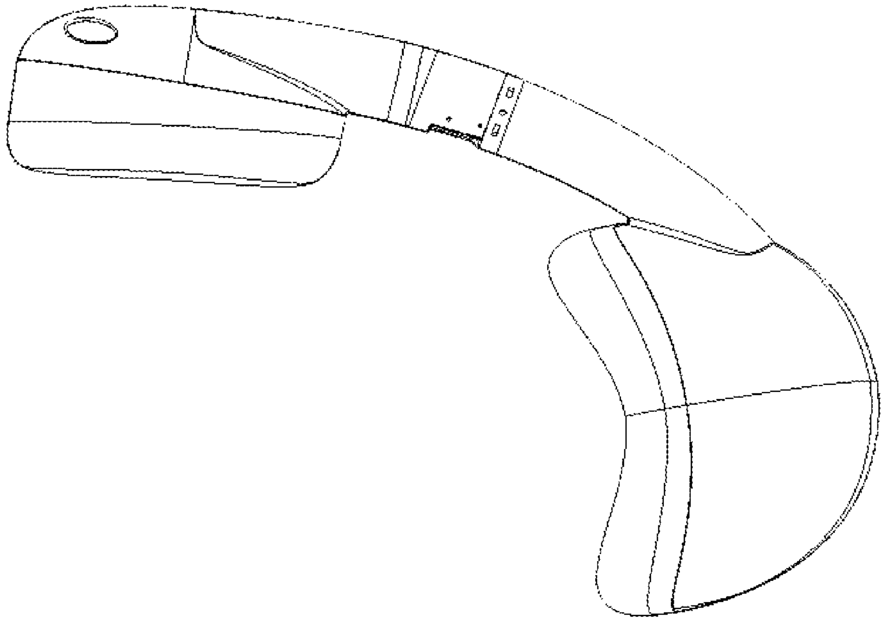
FIG. 20 is a side view of a preferred embodiment of a assistive handset for rehabilitating a speech impediment.
Figure 21:
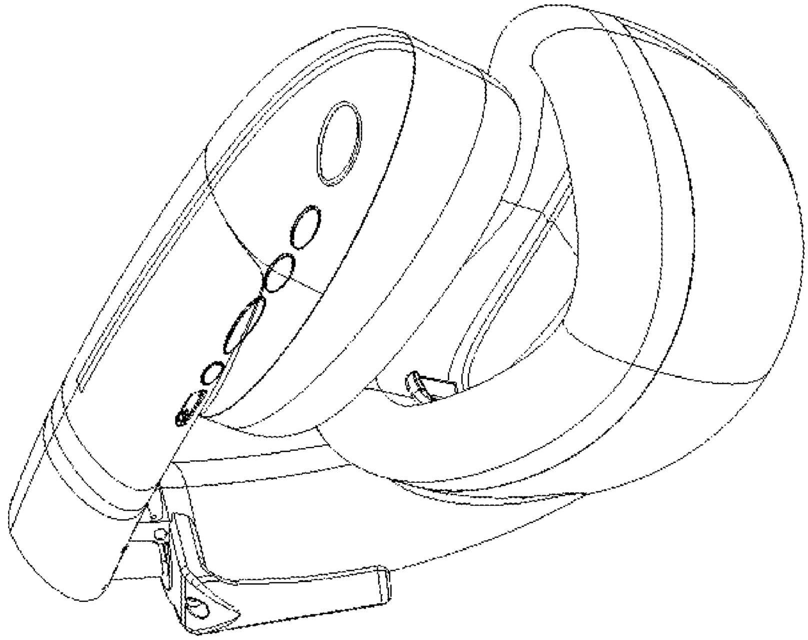
FIG. 21 is a perspective view of a preferred embodiment of a assistive handset for rehabilitating a speech impediment where the handset is in a folded configuration.
Figure 22:
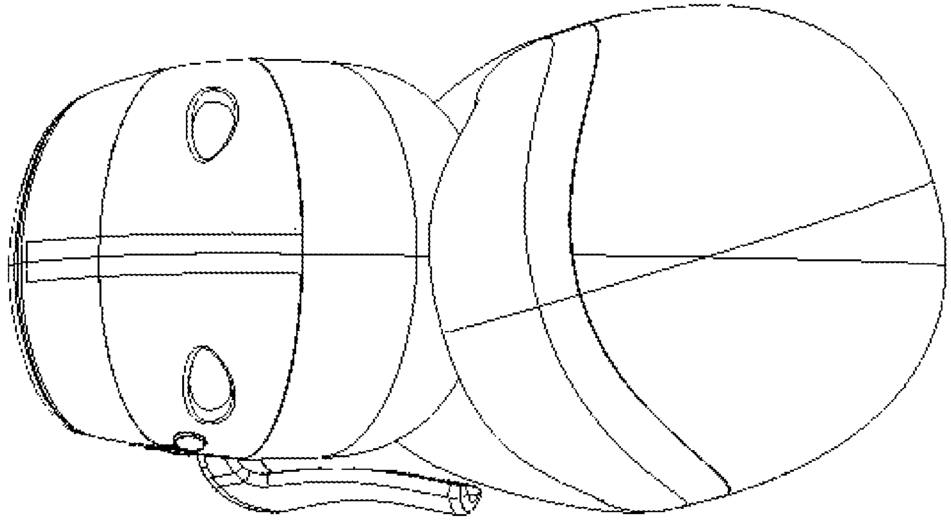
FIG. 22 is a front view of a preferred embodiment of a assistive handset for rehabilitating a speech impediment where the handset is in a folded configuration.
Figure 23:
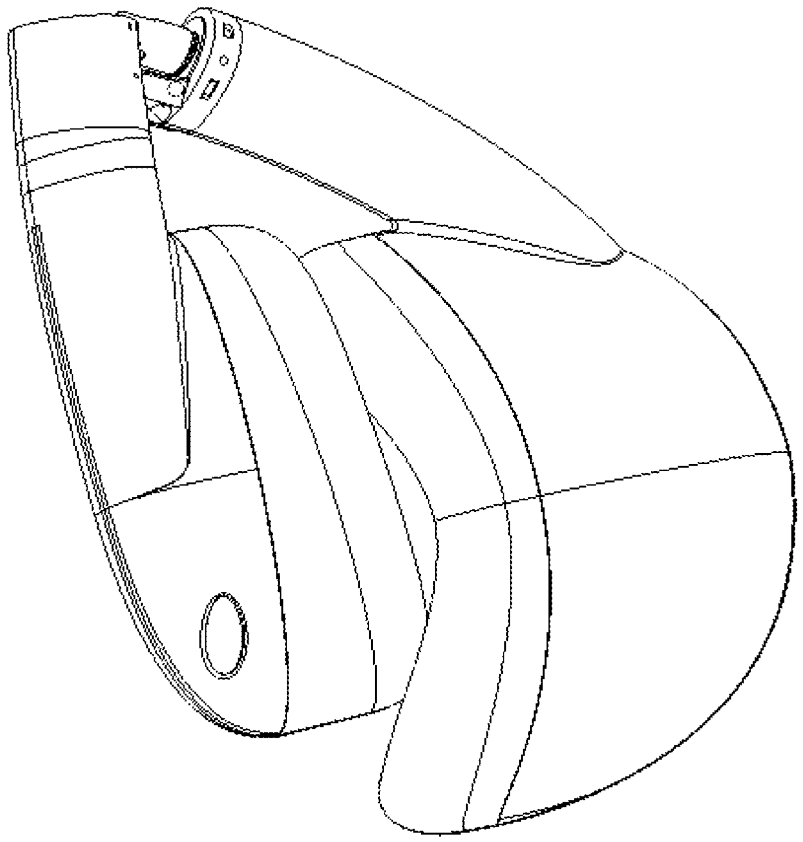
FIG. 23 is a side view of a preferred embodiment of a assistive handset for rehabilitating a speech impediment where the handset is in a folded configuration.
Figure 24:
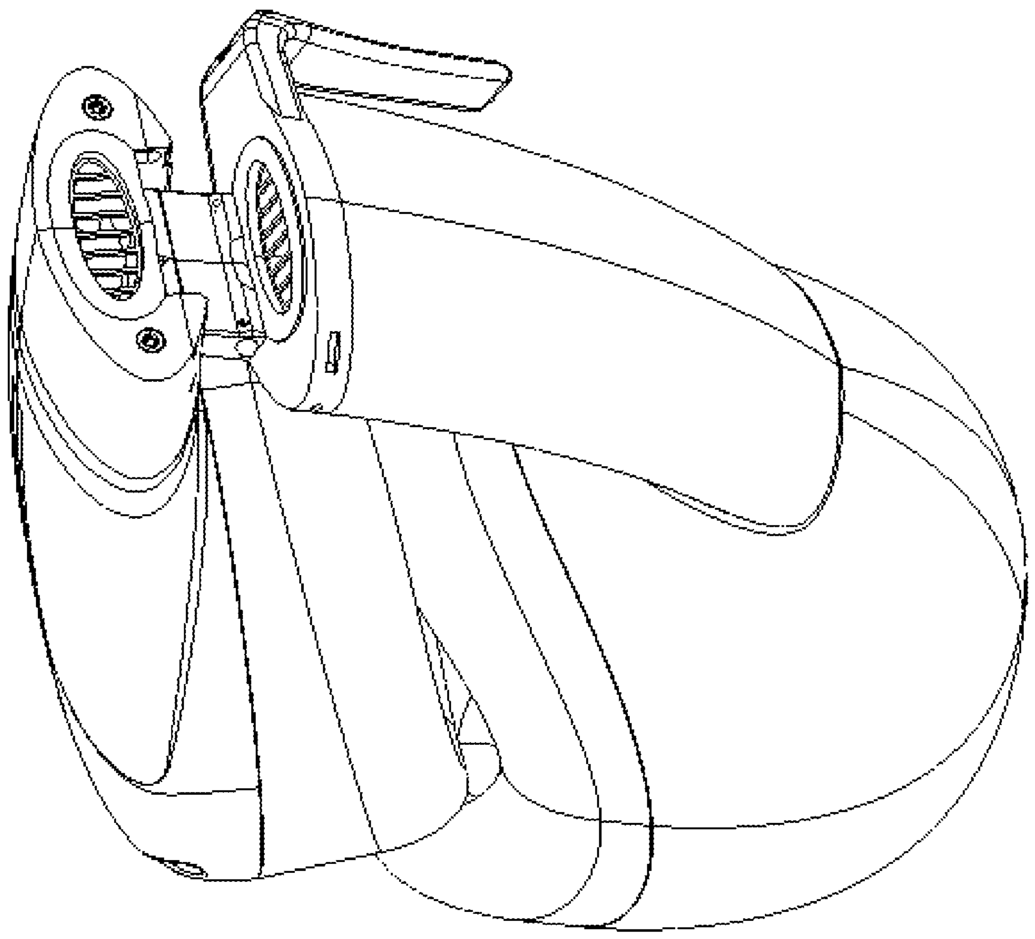
FIG. 24 is a rear-perspective view of a preferred embodiment of a assistive handset for rehabilitating a speech impediment where the handset is in a folded configuration.
Figure 25A:
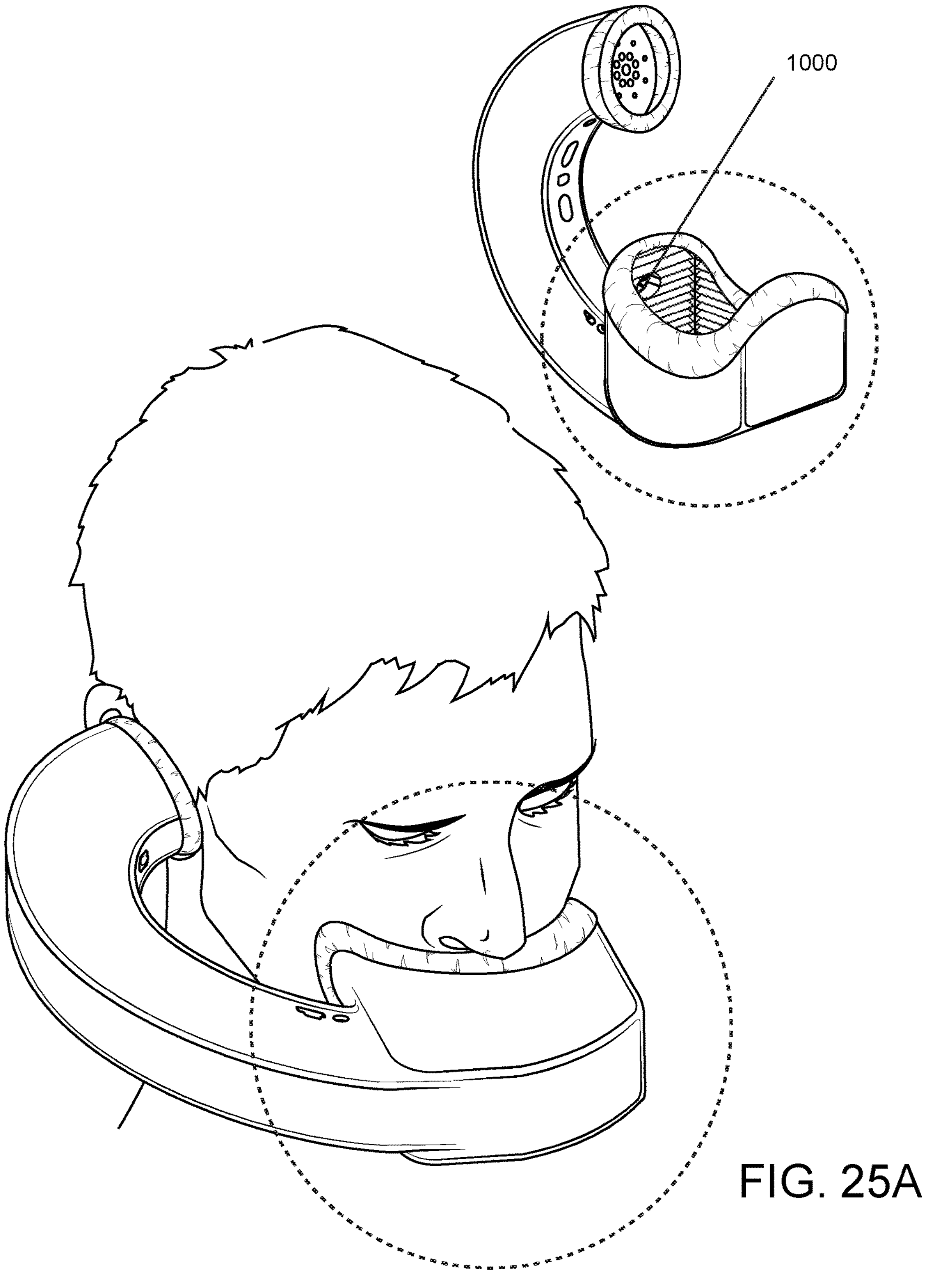
FIG. 25A is an illustration of a prior art handset.
Figure 25B:
FIG. 25B is an illustration of a prior art headset.

FIGS. 15-17 depict flow charts and diagrams for assisting communication of an individual that has a speech disorder or impaired speech. As shown, a user may be shown an image and asked to annunciate what is seen in order to build a vocabulary of words representing the user's impaired vocabulary. Suitably, a database of the user's impaired speech and associated vocabulary is saved in a database such that when a user speaks impaired speech into the handset, corrected speech or else voice to text is output from the quite phone to a microphone or graphical user interface.

FIG. 15 illustrates an example scenario where a user operates a phone and a laptop computer. Suitably, the laptop screen displays vocabulary words or images, such as a cat or dog, to prompt the user to describe what is shown using their impaired or impeded speech. For instance, when the word "walk" is presented, the user may produce an unintelligible utterance like "waht". Similarly, other examples include the letter "A" being pronounced as "AHHH", "for" as "foah", "dog" as "oggg", "my" as "mha", "will take" as "wih Ack", and "I" as "THHHH".

Still referring to FIG. 15, the speech generated by the user is recorded and stored in a word database, associating the recorded speech with the corresponding vocabulary word or image, as well as an electronic version or computerized voice representing the correct pronunciation. As illustrated, this process establishes an impaired speech database, enabling software to automatically recognize that the user's rendition of "ogg" corresponds to "dog". Thus, a user may speak in their natural cadence, intonation, and pronunciation without making any effort to help the listener understand and relieving the impediment sufferer of the stress and muscular effort related to unsuccessful attempts at trying to gain the listener's understanding/comprehension.

Finally, FIG. 15 illustrates that when the user speaks into the handset, the installed software translates the impaired speech in real-time. In one mode of operation, the software compares the user's input to the stored impaired speech database, allowing the software to generate an output that corresponds to the intended message in a more intelligible form. This automated, real-time associative capability facilitates effective communication for individuals with speech impairments using the handset.

Thus, FIG. 15 illustrates a preferred logic flow for the software installed in the computer memory of the handset or cooperating device:

1. User Initialization:
   - Prompt the user to initialize the software upon starting the handset/headset.
   - Collect user-specific data such as name, preferred language, and any specific speech impairments or vocabulary limitations.
2. Vocabulary Database Initialization:
   - Provide the user with a list of vocabulary words, pictures or phrases to annunciate aloud while being recorded.
   - Store the user's incorrect renditions of the words, along with the correct computerized renditions, in a database.
   - Associate each recorded rendition with the corresponding vocabulary word.
3. Online or Local Database Storage:
   - Provide options for storing the vocabulary database either online or locally in the computer memory of the handset/headset.
   - Ensure secure and accessible storage of the database for real-time comparison and retrieval.
4. Real-Time Speech Recognition and Translation:
   - Prompt the user to speak into the handset's chamber, ensuring even pressure and using an attenuator if desired.
   - Convert the user's raw voice into an electrical signal using a microphone and analog matching circuit.
   - Process the electrical signal through audio signal conditioning, amplification, noise reduction, and digital filtering within the Bluetooth (BT) chip.
   - Transmit the processed audio signal wirelessly to a connected cell phone, computer, or other BT-capable device.
5. Impaired Speech Analysis and Comparison:
   - Receive the wireless audio signal on the connected device.
   - Utilize the installed impaired speech assistance software to analyze the user's speech in real-time.
   - Compare the user's unintelligible renditions with the stored vocabulary database, focusing on the incorrect renditions.
6. Generation of Intelligible Output:
   - Retrieve the corresponding correct renditions from the database based on the matched incorrect renditions.
   - Generate intelligible output in the desired format:
   - Convert the incorrect renditions to text, displaying them in a notepad-like section of the software for written communication.
   - Generate a pronounced voice analog signal, transmitting it wirelessly back to the handset/headset for immediate playback through an outside ambient speaker on the device.
   - Optionally, transmit the intelligible voice signal through the wireless communication system (e.g., cell phone call) to enable live communication with others.
7. Real-Time Communication and Interaction:
   - Enable seamless communication between the user and listeners through the translated output.
   - Allow for ongoing interaction and conversation, with the software continuously processing the user's speech and providing accurate associations.

This logic flow outlines a few key steps and functionalities of the software installed in the computer memory of the handset and cooperating phone or computerized device, facilitating real-time speech recognition, comparison, and associations to enable effective communication for individuals with speech impairments.

FIG. 16 through 17 show the flow of hardware and software as it pertains to the device. As shown in FIG. 16 a user's raw voice may be provided into a chamber of a handset that produces even pressure of the voice (see FIGS. 0A, 0B, 13 and 14). Preferably, the chamber of the handset may include an attenuator and microphone as described above for picking up a nondistorted signal of the user's impaired speech. Suitably, a computerized speech recognition software application may thereafter be used to compare the input impaired speech to a database of impaired speech associated with correct vocabulary such that corrected speech or else voice to text is output from the quite phone to a microphone or graphical user interface.

FIG. 17 depicts the hardware and software system for the invention. The process begins with the user speaking their raw voice into the cover of the handset, also known as the "Quietphone®." Within the handset, an attenuator is employed to reduce the decibel level of the voice input by 30 dB. The voice signal is captured by an electret or any microphone, which is connected to a microphone tuning circuit for optimal performance. The signal then enters a Bluetooth chip for further processing and transmission.

The processed voice signal is then directed to a processor device that runs the software responsible for generating the desired output. The software analyzes and interprets the input speech to rehabilitate it, improving its intelligibility. The output can take several forms depending on the user's preference and communication needs. Firstly, the software can convert the rehabilitated speech into text, allowing it to be displayed as written words. This text output can be utilized in various applications, such as notepads, emails, or any other text-based communication platform. Secondly, the rehabilitated speech can be transmitted as part of a regular phone call. The processed voice signal is sent to the recipient on the other end, enabling real-time conversation through traditional phone communication. Lastly, the software can direct the rehabilitated speech to a speaker within the handset. This allows for in-person communication, where the user's rehabilitated speech is emitted audibly, enabling effective interaction with individuals in the immediate vicinity. In some embodiments, the output computer-generated speech or text can be in the user's or any other language.

By providing multiple output options via a touch screen on the graphical user interface of the computerized device (e.g., cell phone, computer, tablet, etc.), the hardware and software system of the invention ensures that individuals with speech impairments have versatile means of communication, tailored to their specific needs and preferences.

FIGS. 19 through 22 illustrate several views and configurations of a preferred embodiment of a assistive handset for rehabilitating a speech impediment. Suitably, the handset incorporates the technologies disclosed above, including noise canceling of the impaired speech, and automated association of the impaired speech with an intelligible output. Here are a few use cases contemplated via the figures in this specification:

Use Case: Quietphone® (FIGS. 18-24) for Assisting Impaired Speech

The Quietphone® (FIGS. 18-24) is a device to assist individuals with impaired speech by providing real-time interpretation and communication support. The use case may work as follows:

1. User Interaction:
   - The user utilizes the Quietphone® or an open microphone on their cell phone to speak into the device.
   - The microphone within the device converts the mechanical voice signal into an electrical signal, which comprises voltage and current representing the voice.
2. Signal Conditioning:
   - The electrical voice signal passes through an analog matching circuit that applies analog signal conditioning and filtering to optimize the signal quality.
3. Bluetooth Connectivity:
   - The conditioned signal enters the QCC3044 Bluetooth Chip (BT) or a similar BT communications chip.
   - Inside the BT chip, the signal undergoes another phase of audio signal conditioning, this time in the digital domain.
   - This conditioning stage allows for signal amplification, equalization, automatic gain control, and various other audio enhancements such as noise reduction and digital filtering.
4. Wireless Transmission:
   - Once the audio signal is fully processed, it is transmitted wirelessly within the BT frequency range.
   - The wireless signal, containing the user's voice, is sent to the connected cell phone or other BT-capable devices where the impaired speech assistance software and user voice recognition database reside.
5. Impaired Speech Assistance Software:
   - The cell phone (or computer) receives the BT signal, and the dedicated impaired speech aid application (APP) processes the raw voice audio signal.
   - Using the user's previously trained voice database, the APP generates accurate and appropriate words or phrases that correspond to the user's intended message with a high level of accuracy.
6. Output Formats:
   - The generated output can be converted into different formats:
   - Written text can be displayed in a notepad-like section of the APP, used in emails, or any other application on the cell phone/tablet/computer.
   - A computer-generated pronounced voice analog signal is sent back to the Quietphone® via BT.
   - The signal is converted into an electrical signal that travels to a second speaker within the Quietphone®.
   - The intelligible audio signal is emitted through the speaker, allowing the user to engage in real-time conversations with those around them.
   - Conditioning and amplification stages between the BT chip and the speaker optimize the audio quality.
   - A computer-generated pronounced voice analog signal is transmitted through wireless communication systems, such as a cell phone call or computer call, allowing listeners (not the user) to hear the intelligible computer-generated voice in real-time communication.
7. Seamless Communication:
   - In both scenarios, the APP takes approximately 150 milliseconds to process the user's partially intelligible or non-intelligible raw words and match them to clear and concise words.
   - This enables seamless communication between the user and listeners, ensuring efficient and effective interactions in real-time.

By utilizing the Quietphone® and the impaired speech assistance software, individuals with impaired speech can overcome communication barriers, enabling them to express themselves more clearly and engage in meaningful conversations with others.

Use Case: Quietphone® (FIGS. 18-24) for Quietphone® Calls

Suitably, the Quietphone® (FIGS. 18-24) serves as a device to facilitate Quietphone® calls for users who require a noise-free environment or have privacy concerns. The use case may work as follows:

1. User Interaction:
   - The user utilizes the Quietphone® or an open microphone on their cell phone to speak into the device.
   - The microphone within the device converts the mechanical voice signal into an electrical signal, which comprises voltage and current representing the voice.
2. Signal Conditioning:
   - The electrical voice signal passes through an analog matching circuit that applies analog signal conditioning and filtering to optimize the signal quality.
   - Bluetooth Connectivity:
   - The conditioned signal enters the QCC3044 Bluetooth Chip (BT) or a similar BT communications chip.
   - Inside the BT chip, the signal undergoes another phase of audio signal conditioning, this time in the digital domain.

This conditioning stage allows for signal amplification, equalization, automatic gain control, and various other audio enhancements such as noise reduction and digital filtering.

3. Wireless Transmission:
   After the signal is fully processed, it is transmitted wirelessly within the BT frequency range.
   The wireless signal carrying the user's voice is sent to the connected cell phone or other BT-capable devices.
4. Cellular or Internet Communication:
   The cell phone (or connected device) receives the BT signal containing the user's voice and transmits it wirelessly, either through cellular frequency bands (600 MHz to 6 GHz) or over the internet, depending on the communication mode being used (cellular network or internet-based program).
5. Bidirectional Communication:
   Simultaneously, the cell phone receives data from the other party involved in the call, typically another cell phone.
   This data signal is received by the cell phone and then transmitted back to the Quietphone® via BT.
6. Audio Playback:
   The wireless signal reaches the BT chip inside the Quietphone®, where it is converted back into an electrical signal.
   The electrical signal is then directed to the Quietphone®'s speaker, located near the user's ear.
   Conditioning and amplification stages between the BT chip and the speaker ensure optimal audio quality.
7. Alternative Communication Devices:
   The same process can be applied to other communication devices like laptops, iPads, and more.
   In such cases, the call signal may travel through the internet instead of relying on the cellular network.

By utilizing the Quietphone® or similar devices, users can make phone calls in a quiet and private manner. The technology enables wireless communication between the user's device and the cell phone or other devices, ensuring that the user's voice is transmitted clearly while also offering signal conditioning and audio enhancements.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shall not be read to mean that the narrower case is intended or required in instances where such broadening phrases might be absent. Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

The invention claimed is:

1. A passive acoustical attenuator for a microphone, said acoustical attenuator combining attenuation to lower a sound level of a sound introduced into the microphone with physical protection for the microphone;

wherein the passive acoustical attenuator for a microphone is disposed within a chamber of a handset and a speech sound enters the proximate inlet and is reduced in level and then converted to an electric signal;

wherein the speech sound is an impeded speech sound and the plosive energy of the impeded speech sound is screened via a diaphragm;

wherein the electric signal is sent to a computerized device featuring computer readable memory with installed software for rehabilitating the impeded speech sound and a processor for executing the installed software for rehabilitating the impeded speech sound; wherein:

the software features:

an Impaired Speech Analysis and Comparison module configured to receive the electric signal and recognize the electrical signal as an unintelligible rendition of a word or phrase;

a Generation of Intelligible Output module configured to rehabilitate the unintelligible rendition of the word or phrase via generating an intelligible output as a different electric signal;

wherein the Impaired Speech and the Generation of Intelligible Output modules are executed by the processor and the different electric signal is output from the computerized device;

wherein the different electric signal is output via a speaker wherein the different electric signal is used to generate a voice;

wherein the handset is configured to reduce the plosive raw voice of the impaired speech;

wherein speaker is located externally of said chamber of the handset; and, where the handset includes a low durometer voice air flow flap for exhale speech and inhale life air intake as needed for plosive words require more air flow for pronunciation.

2. A passive acoustical attenuator for a microphone, said acoustical attenuator combining attenuation to lower a sound level of a sound introduced into the microphone with physical protection for the microphone;

wherein the passive acoustical attenuator for a microphone is disposed within a chamber of a handset and a speech sound enters the proximate inlet and is reduced in level and then converted to an electric signal;

wherein the speech sound is an impeded speech sound and the plosive energy of the impeded speech sound is screened via a diaphragm; and, wherein the electric signal is sent to a computerized device featuring computer readable memory with installed software for rehabilitating the impeded speech sound and a processor for executing the installed software for rehabilitating the impeded speech sound;

wherein:

the software features:

an Impaired Speech Analysis and Comparison module configured to receive the electric signal and recognize the electrical signal as an unintelligible rendition of a word or phrase;

a Generation of Intelligible Output module configured to rehabilitate the unintelligible rendition of the word or phrase via generating an intelligible output as a different electric signal;

wherein the Impaired Speech and the Generation of Intelligible Output modules are executed by the processor and the different electric signal is output from the computerized device;

wherein the different electric signal is output via a speaker wherein the different electric signal is used to generate a voice;

wherein speaker is located externally of said chamber of the handset;

wherein the handset is configured to reduce the plosive raw voice of the impaired speech;

where the handset includes a low durometer voice air flow flap for exhale speech and inhale life air intake as needed for plosive words require more air flow for pronunciation; and, wherein the air flow flap is a two-way vent such that the area for voice air intake and exhaust may be open for normal speech and air inhalation but closed off during expression of plosive words.

* * * * *